(12) United States Patent
Reichenbach et al.

(10) Patent No.: US 8,035,966 B2
(45) Date of Patent: Oct. 11, 2011

(54) ELECTRONICS PACKAGE FOR SYNTHETIC JET EJECTORS

(75) Inventors: Robert T. Reichenbach, Pflugerville, TX (US); John Stanley Booth, Austin, TX (US)

(73) Assignee: Nuventix, Inc., Austin, TX (US)

( * ) Notice: Subject to any disclaimer, the term of this patent is extended or adjusted under 35 U.S.C. 154(b) by 0 days.

(21) Appl. No.: 11/710,586

(22) Filed: Feb. 22, 2007

(65) Prior Publication Data

US 2007/0272393 A1 Nov. 29, 2007

Related U.S. Application Data

(60) Provisional application No. 60/776,649, filed on Feb. 23, 2006.

(51) Int. Cl.
*H05K 7/20* (2006.01)
*G06F 1/20* (2006.01)

(52) U.S. Cl. .................. 361/694; 361/679.46; 361/690; 181/206; 381/71.1; 700/300

(58) Field of Classification Search .......... 361/690, 361/694–695, 679.46, 679.48; 454/184; 700/300, 299; 165/288, 908; 181/206; 381/71.1
See application file for complete search history.

(56) References Cited

U.S. PATENT DOCUMENTS

| | | | | |
|---|---|---|---|---|
| 5,798,465 A * | 8/1998 | Ziada et al. | ............... | 73/861.21 |
| 5,894,990 A * | 4/1999 | Glezer et al. | ............... | 239/423 |
| 5,930,103 A * | 7/1999 | Heck | ............... | 361/187 |
| 5,988,522 A * | 11/1999 | Glezer et al. | ............... | 239/11 |
| 6,123,145 A * | 9/2000 | Glezer et al. | ............ | 165/104.33 |
| 6,457,654 B1 * | 10/2002 | Glezer et al. | ............... | 239/4 |
| 6,471,477 B2 * | 10/2002 | Hassan et al. | ............... | 416/90 A |
| 6,491,254 B1 * | 12/2002 | Walkinshaw et al. | ...... | 244/118.5 |
| 6,588,497 B1 * | 7/2003 | Glezer et al. | ............... | 165/84 |
| 6,644,598 B2 * | 11/2003 | Glezer et al. | ............... | 244/208 |
| 6,931,306 B2 * | 8/2005 | Frankel et al. | ............... | 700/300 |
| 7,275,380 B2 * | 10/2007 | Durant et al. | ............... | 62/178 |
| 7,282,873 B2 * | 10/2007 | Abali et al. | ............... | 318/41 |
| 7,453,899 B1 * | 11/2008 | Vaida et al. | ............... | 370/419 |
| 7,483,270 B2 * | 1/2009 | Blake | ............... | 361/679.48 |
| 7,894,613 B1 * | 2/2011 | Ong et al. | ............... | 381/71.3 |
| 2005/0210896 A1 * | 9/2005 | Durant et al. | ............... | 62/178 |
| 2006/0044760 A1 * | 3/2006 | Pal | ............... | 361/700 |
| 2006/0196638 A1 * | 9/2006 | Glezer et al. | ............... | 165/80.3 |
| 2007/0023169 A1 * | 2/2007 | Mahalingam et al. | ... | 165/104.28 |
| 2008/0041574 A1 * | 2/2008 | Arik et al. | ............... | 165/287 |

FOREIGN PATENT DOCUMENTS

| JP | 06008581 A | * | 1/1994 |
|---|---|---|---|
| WO | WO 03090288 A2 | * | 10/2003 |
| WO | WO 2005008348 A2 | * | 1/2005 |

* cited by examiner

*Primary Examiner* — Robert J Hoffberg

(74) *Attorney, Agent, or Firm* — John A. Fortkort; Fortkort & Houston P.C.

(57) ABSTRACT

A thermal management system (101), comprising (a) a synthetic jet actuator (103), and (b) a processor (107) in communication with the synthetic jet actuator, the processor being adapted to receive programming instructions, and being further adapted to modify the operation of the synthetic jet actuator in response to the programming instructions.

29 Claims, 20 Drawing Sheets

United States Patent 8,035,966 B2

ELECTRONICS PACKAGE FOR SYNTHETIC JET EJECTORS

CROSS-REFERENCE TO RELATED APPLICATIONS

The present application claims priority from U.S. Provisional Patent Application Ser. No. 60/776,649 (Reichenbach et al.), filed on Feb. 23, 2006 and incorporated herein by reference in its entirety.

FIELD OF THE DISCLOSURE

The present disclosure relates generally to thermal management systems, and more specifically to electronic packages for use with thermal management systems that comprise synthetic jet ejectors.

BACKGROUND OF THE DISCLOSURE

As the size of semiconductor devices has continued to shrink and circuit densities have increased accordingly, the thermal management of these devices has become more challenging. This problem is expected to worsen in the foreseeable future.

In the past, the thermal management of semiconductor devices and the equipment that incorporates them was often addressed through the use of forced convective air cooling, either alone or in conjunction with various heat sink devices, and was accomplished through the use of fans. However, fan-based cooling systems were found to be undesirable due to the electromagnetic interference and acoustical footprint attendant to their use. Moreover, the use of fans requires relatively large moving parts, and correspondingly high power inputs, in order to achieve the desired level of heat transfer.

More recently, thermal management systems have been developed which utilize synthetic jet ejectors. These systems are more energy efficient than comparable fan-based systems, and also offer reduced levels of noise and electromagnetic interference. Systems of this type are described in greater detail in U.S. Pat. No. 6,588,497 (Glezer et al.).

While thermal management systems which utilize synthetic jet ejectors have a number of advantages over other types of thermal management systems, further improvements in these systems are required to more fully leverage the synthetic jet ejector technology. Some of these improvements are realized in the devices, methodologies and systems disclosed herein.

SUMMARY OF THE DISCLOSURE

Figure 1:
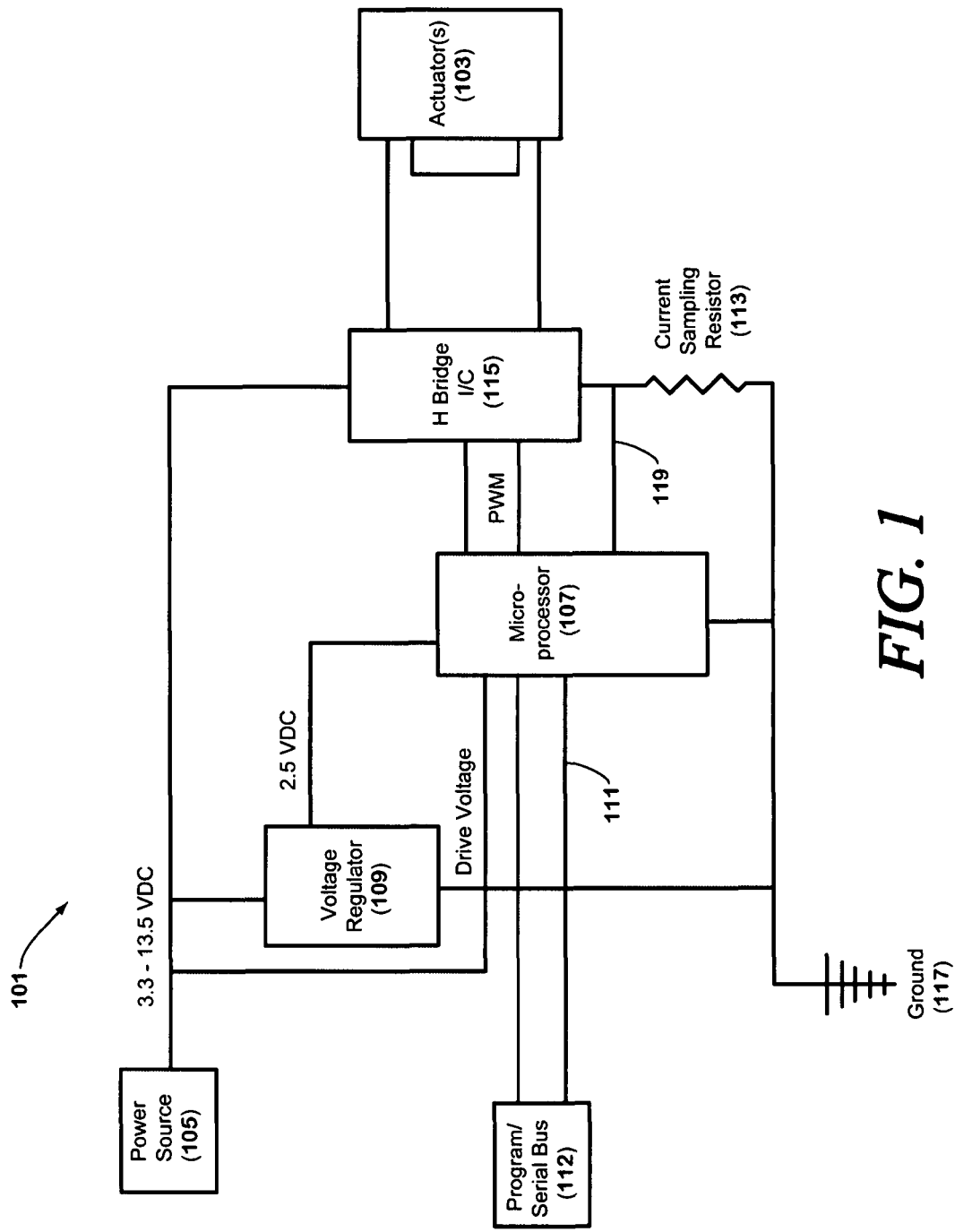
FIG. 1 is an illustration of the electronic configuration of a thermally managed system made in accordance with the teachings herein and equipped with a digital driver with variable input voltage control of the cooling device (driver signal amplitude)

In one aspect, a thermal management system is provided herein. The thermal management system comprises (a) a synthetic jet actuator, and (b) a processor in communication with the synthetic jet actuator, the processor being adapted to receive programming instructions, and being further adapted to modify the operation of the synthetic jet actuator in response to the programming instructions.

In another aspect, a thermal management device is provided herein. The thermal management device comprises a synthetic jet ejector adapted to operate at a variable operating amplitude and frequency, and a processor adapted to modify the operating amplitude and frequency of the synthetic jet ejector.

In a further aspect, a thermal management system embedded in a host system is provided herein. The thermal management system comprises (a) a plurality of synthetic jet ejectors, and (b) a processor adapted to control the operation of said plurality of synthetic jet ejectors in accordance with programming instructions.

In yet another aspect, a monitoring system is provided herein. The monitoring system comprises (a) a plurality of monitored systems, wherein each of said plurality of monitored systems has a plurality of system components, and wherein each of said system components has at least one synthetic jet ejector associated therewith; and (b) a central facility, remotely disposed from said plurality of monitored systems, which is adapted to monitor the operation of the synthetic jet ejectors associated with the system components of each of said plurality of monitored systems.

In still another aspect, a method for collecting information from a plurality of systems, wherein each of said plurality of systems has a plurality of system components, is provided herein. In accordance with the method, at least one synthetic jet ejector is provided which is associated with each of said plurality of system components, and information is collected about the system components from the synthetic jet ejectors.

These and other aspects of the present disclosure are described in greater detail below.

DETAILED DESCRIPTION

In the following description, like numbers represent like elements. Thus, for example, elements 203, 303, 403 and 503 represent elements similar to element 103. Elements 205, 305 and 505 represent elements similar to element 105. Elements 207, 307, 407 and 507 represent elements similar to element 107. Elements 209 and 309 represent elements similar to element 109. Elements 211, 311, 411 and 511 represent elements similar to element 111. Elements 212, 312, 412, 512 and 612 represent elements similar to element 112. Elements 213, 313, 413 and 513 represent elements similar to element 113. Elements 215, 315, 415 and 515 represent elements similar to element 115. Elements 217, 317, 417, 517 and 617 represent elements similar to element 117. Elements 219, 319, 419 and 519 represent elements similar to element 119. Elements 321 and 521 represent elements similar to element 221. Elements 323 and 523 represent elements similar to element 223. Element 629 represents an element similar to element 429. Elements 653, 655, 657, 661 and 663 represent elements similar to elements 103, 105,-107, 111 and 113, respectively.

It has now been found that the synthetic jet ejectors utilized in thermal management systems based on these devices may be leveraged as information gathering devices, especially in implementations in which the synthetic jet ejectors are distributed throughout or across a host system. Typically, synthetic jet ejectors will be disposed at known hotspots in a host system and in other locations that are of particular interest to administrators and managers of the host system. By leveraging these devices to gather information (such as, for example, thermal data or operational status) about the host system and components thereof, the infrastructure of the thermal management system may be utilized as a general data acquisition and control mechanism, in addition to its use as a thermal management system.

Moreover, as a result of the increased communication possible between the components of the thermal management systems described herein, the interaction between individual synthetic jet ejectors may be taken into consideration, thus allowing optimization of the thermal management system as a whole. Moreover, by networking synthetic jet ejectors in such a system, provisions can be made so that the thermal management system can compensate for (or re-optimize the thermal management system to account for) changes in operational status of components of the thermal management system and/or the host system, such as the failure of an individual fan or synthetic jet ejector, the deactivation of certain host system components or resources, or other such events.

FIG. 1 illustrates a first particular, non-limiting embodiment of a thermal management device 101 of the type disclosed herein. This particular device 101 is equipped with a synthetic jet actuator 103 that is powered by a power source 105 that varies from 3.3 to 13.5 volts of DC current. It will be appreciated, of course, that this voltage range is merely exemplary, and that a variety of thermal management devices and systems may be made in accordance with the teachings herein that operate on voltages outside of this range. Thus, for example, in some embodiments, devices and systems may be made which are adapted to run off of charge pumps, in which case the input voltage may be as little as 1 volt. On the other hand, silicon chip sets are currently known to the art which can be used in conjunction with the thermal management devices and systems described herein and which can accommodate input voltages as high as 24 volts.

The thermal management device 101 is provided with a microprocessor 107 or integrated circuit that controls the device, and a voltage regulator 109 which supplies the proper voltage to the microprocessor 107. The thermal management device 101 is also equipped with programming lines 111 to the microprocessor 107 that allow the device to communicate with a serial bus 112 or other such device. In a basic device, the programming lines 111 might run to test pads on a board that are used to test the device at the point of manufacture. In more advanced systems and devices, such as the embodiments described herein which are adapted to download software, firmware and other programming elements over a network or over the Internet, these lines may be connected to the host system so that the host can send the programming data necessary to reprogram, reconfigure or update the thermal management device 101 or a thermal management system that it is a component of.

The thermal management device 101 is also equipped with a current sampling resistor 113 which is adapted to sample the current of the H bridge 115, and is also provided with a ground 117. The current sampling resistor 113 is provided with a feedback node 119 to the microprocessor 107 so that the thermal management device 101 can sense what current is flowing through the current sampling resistor 113 and, therefore, through the H bridge 115 and into the actuator 103. Consequently, the thermal management device 101 is able to detect changes, irregularities or failures in the H bridge 115 or in the actuator current.

Figure 2:
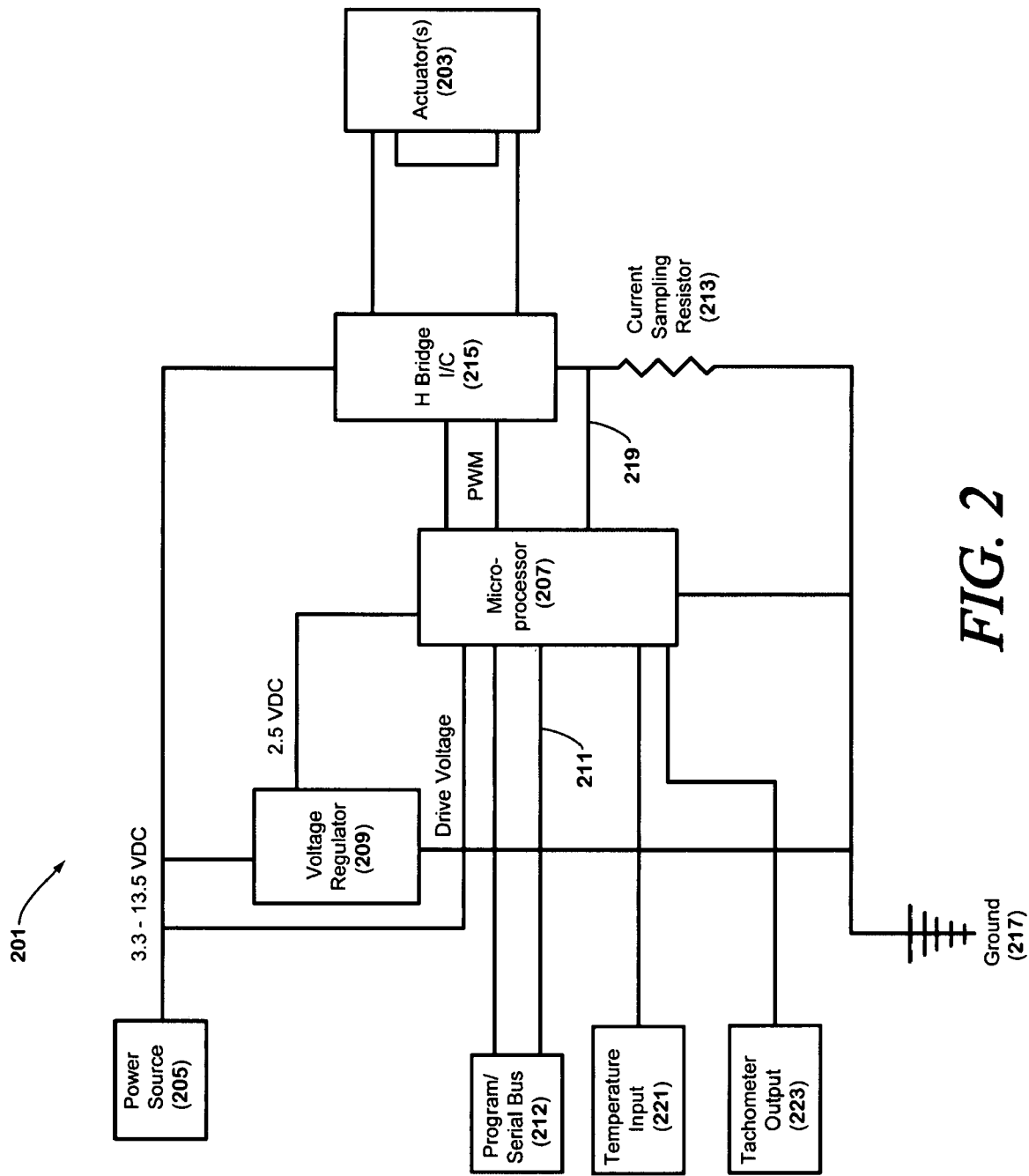
FIG. 2 is an illustration of the electronic configuration of a thermally managed system made in accordance with the teachings herein and equipped with a digital driver with variable input voltage control of the cooling device (driver signal amplitude) and with tachometer output and ambient or target temperature input.

FIG. 2 illustrates another particular, non-limiting embodiment of a thermal management system 201 used to drive a synthetic jet actuator of the type disclosed herein. This system 201 is similar in most respects to the system depicted in FIG. 1, except that a temperature input feature 221 and tachometer output feature 223 have been added. The tachometer output feature 223 provides an additional means by which the thermal management system 201 can dialog with the host system.

Figure 3:
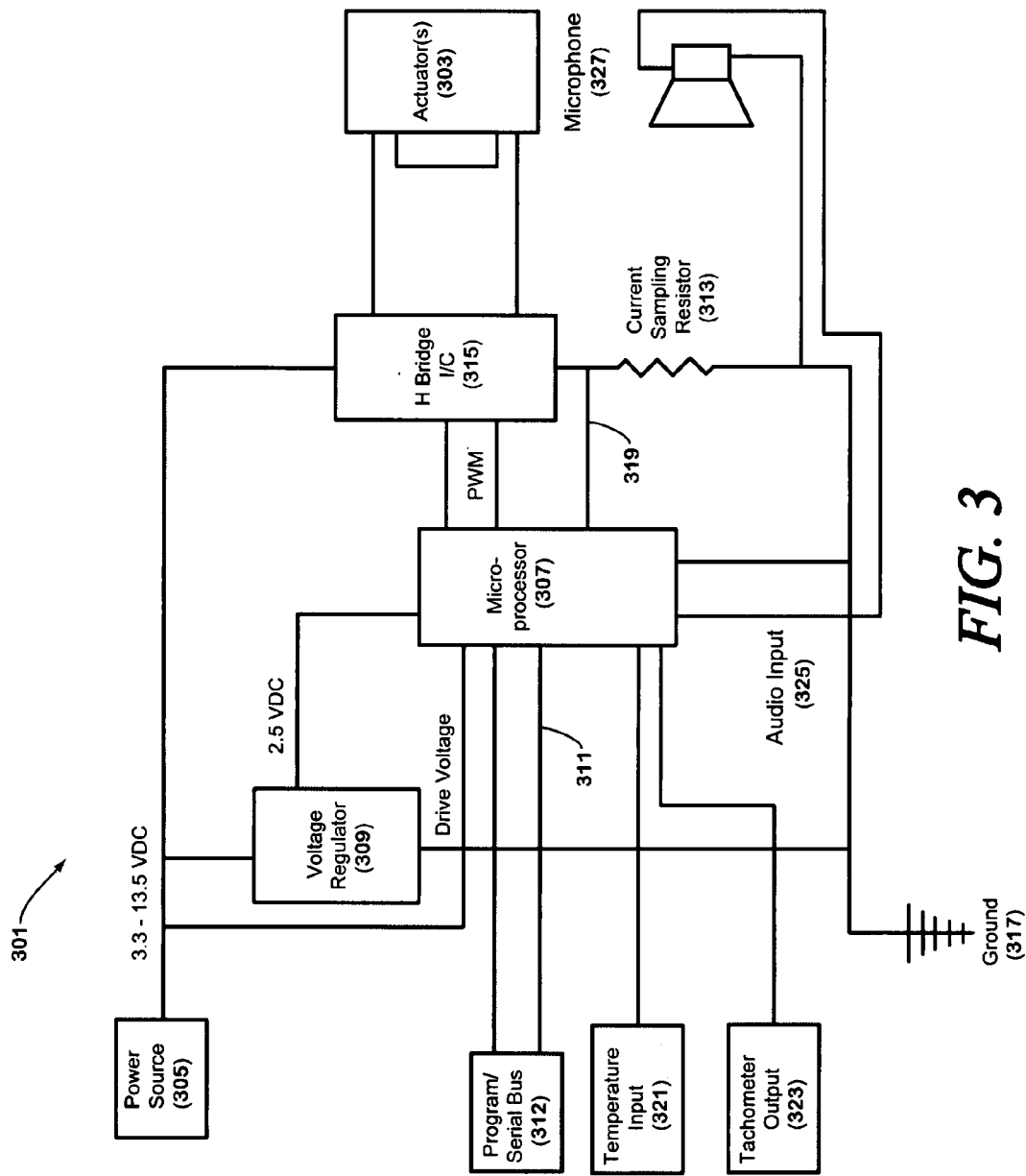
FIG. 3 is an illustration of the electronic configuration of a thermally managed system made in accordance with the teachings herein and equipped with a digital driver with variable input voltage control of the cooling device and with tachometer output and temperature and ambient or target temperature and acoustic (audio) input.

FIG. 3 illustrates another particular, non-limiting embodiment of a thermal management system 301 of the type disclosed herein. This system is similar in most respects to the system depicted in FIG. 2, except that an audio input signal 325 and microphone 327 have been added to provide audio feedback to the thermal management system 301. The audio input 325 will typically be analyzed to adjust actuator drive parameters such as drive amplitude and drive frequency or waveform harmonic compensation to minimize the undesirable acoustic artifacts being captured by the microphone 327.

Figure 4:
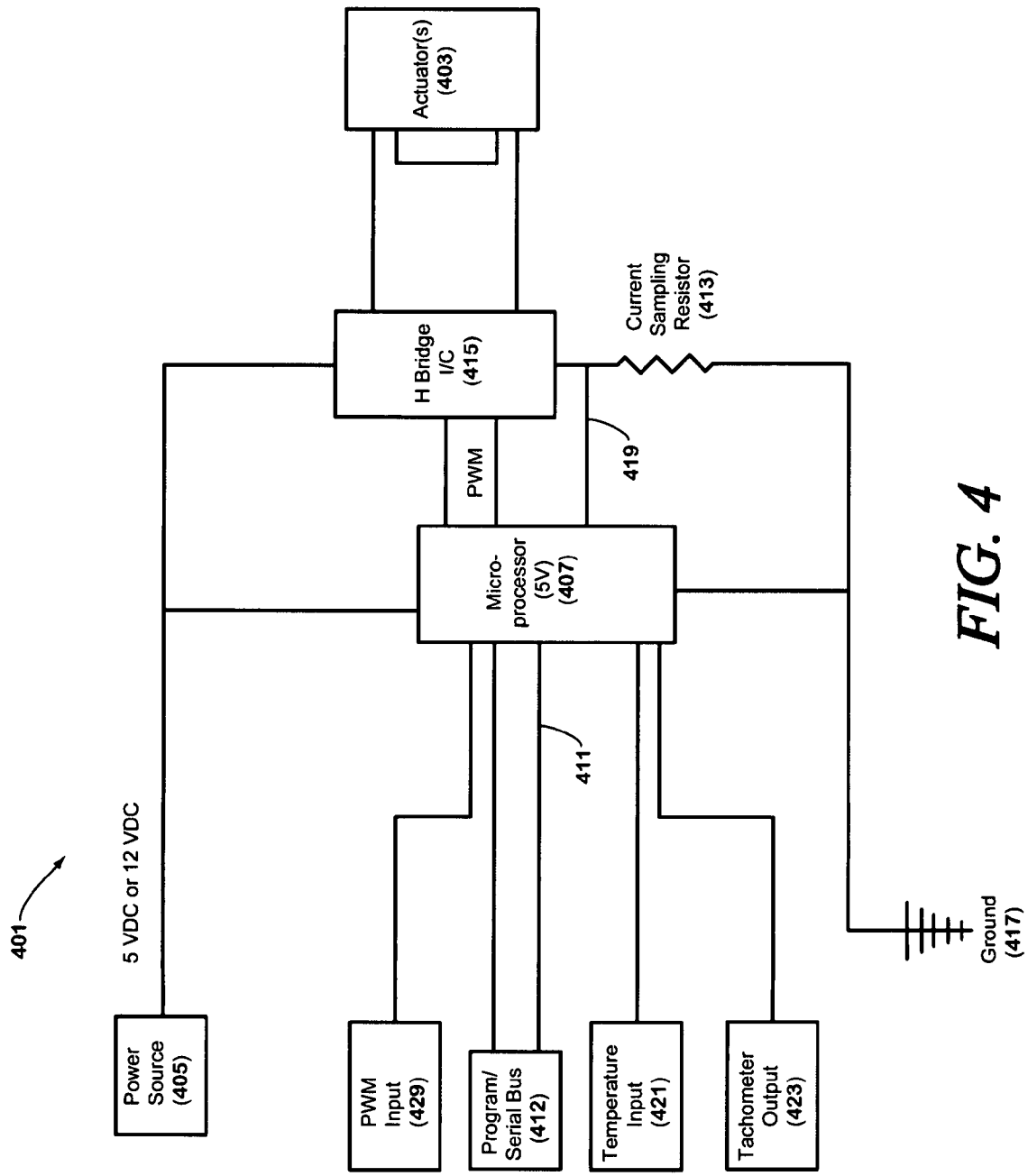
FIG. 4 is an illustration of the electronic configuration of a thermally managed system made in accordance with the teachings herein and equipped with a digital driver with PWM control, tachometer output and ambient or target temperature input.

FIG. 4 illustrates a further particular, non-limiting embodiment of a thermal management system 401 of the type disclosed herein. This system is similar in some respects to the system depicted in FIG. 1. However, this system is adapted to run off of a fixed power source 405. Consequently, it does not require a voltage regulator. In the particular embodiment depicted, the thermal management system 401 is adapted to run off of an input voltage of 5 volts or 12 volts, which is supplied by a DC power source 405. However, as noted above, the thermal management system 401 could be adapted to run off of a wide range of voltages, and could be powered by various types of power sources. Since the system 401 has a fixed voltage, voltage is no longer a controlled input. Instead, the controlled input is provided by a pulse width modulated (PWM) input 429. The system of FIG. 4 is also equipped with a temperature input 421 and a tachometer output 423.

Figure 5:
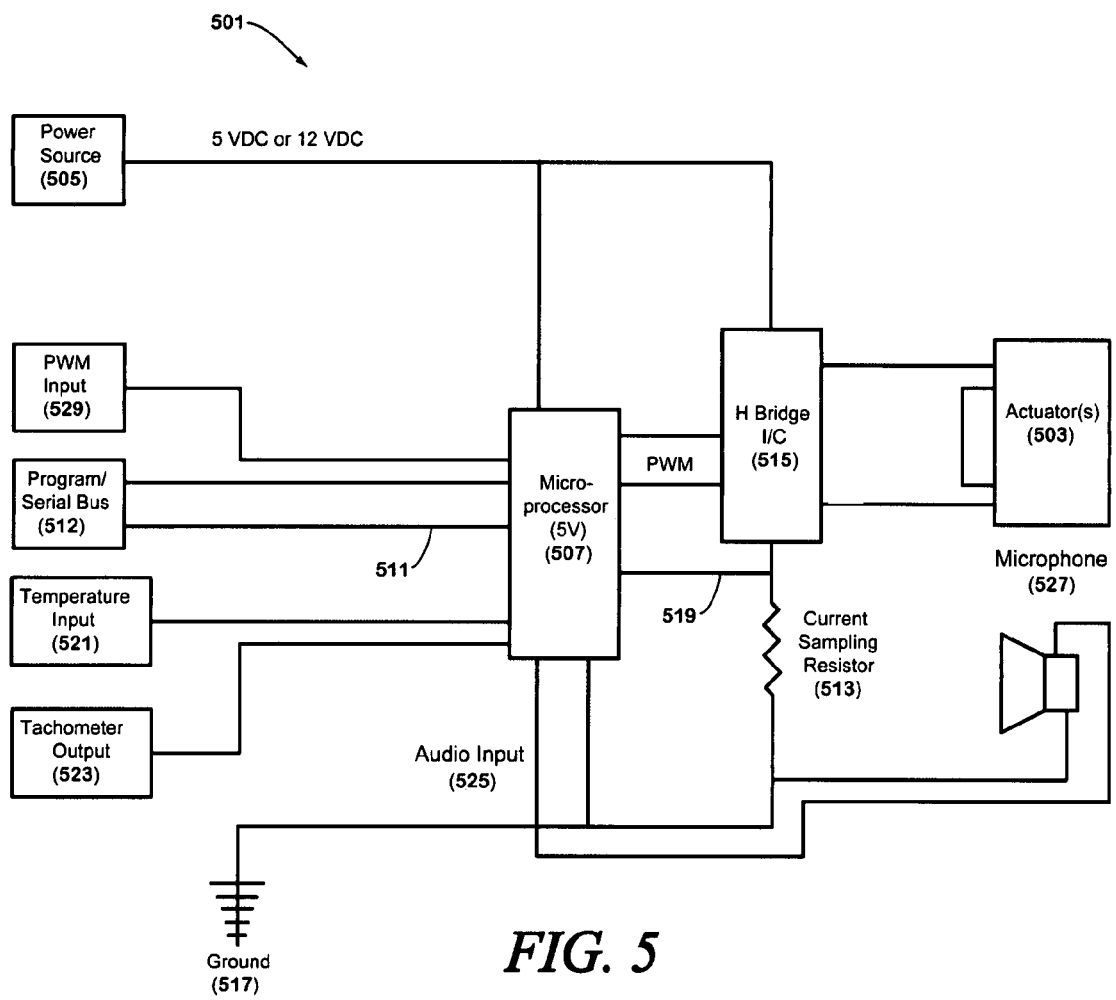
FIG. 5 is an illustration of the electronic configuration of a thermally managed system made in accordance with the teachings herein and equipped with a digital driver with PWM control, tachometer output and ambient or target temperature and acoustic (audio) input.

FIG. 5 illustrates a further particular, non-limiting embodiment of a thermal management system 501 of the type disclosed herein. This system is similar in most respects to the system depicted in FIG. 4. However, an audio input 525 and a closed loop microphone 527 have been added to the system 501 to provide audio feedback. It will be appreciated, of course, that the microphone 527 could be substituted with a current sensor or other type of feedback device.

Figure 6:
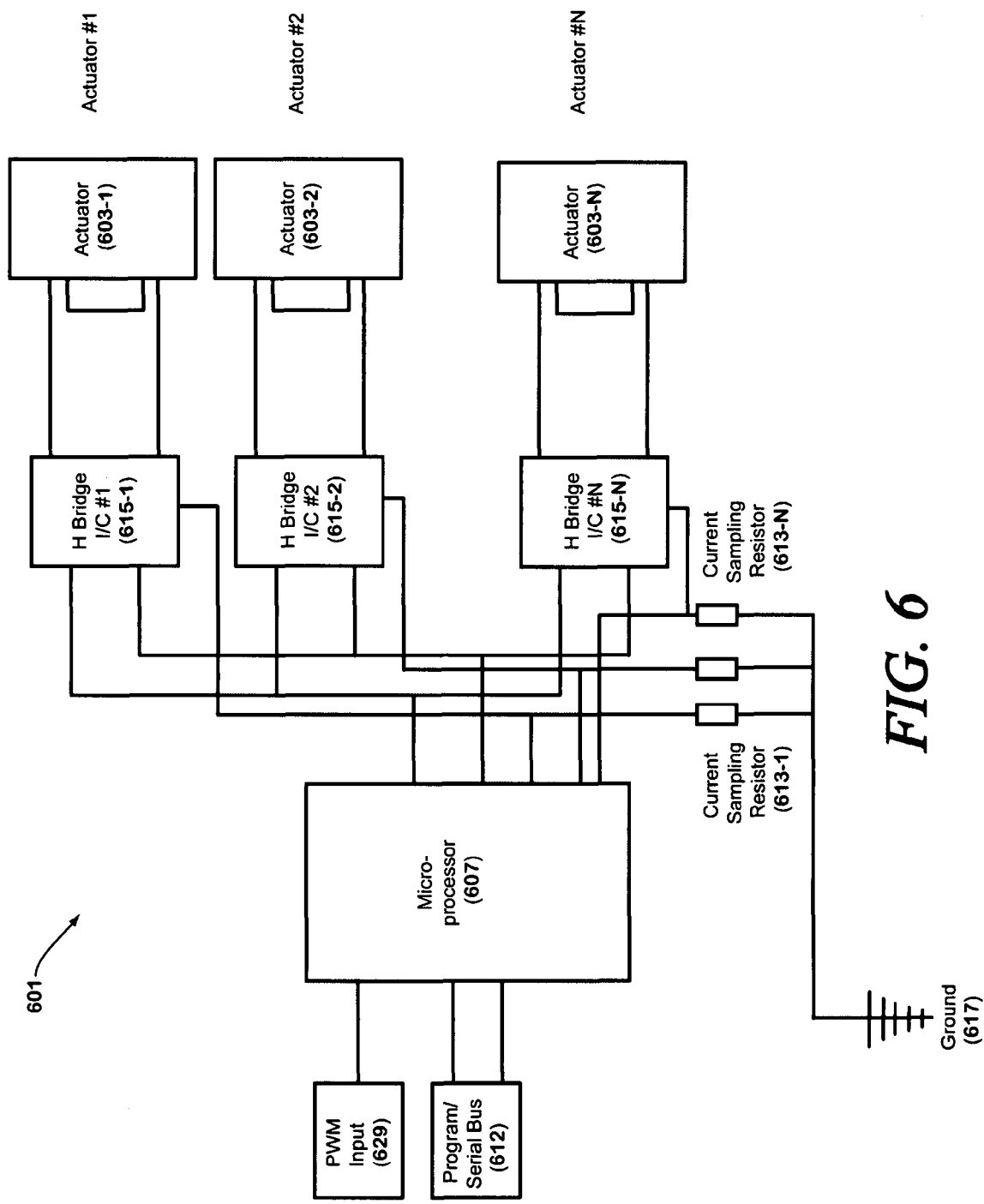
FIG. 6 is an illustration of the electronic configuration of a thermally managed system made in accordance with the teachings herein which features a multiple actuator driver with current monitoring for each actuator.

FIG. 6 illustrates a further particular, non-limiting embodiment of a thermal management system 601 of the type disclosed herein. The system depicted therein is equipped with N actuators 603-1 to 603-N, each of which is driven by its own H-bridge or class D or other amplifier 615-1 to 615-N and each of which has its own current sampling resistor 613-1 to 613-N associated with it. It will be appreciated, of course, that several variations of this embodiment are possible. Thus, for example, the actuators 603-1 to 603-N may share a common H-bridge, or may be run directly off of the controller 605. Each actuator 603-1 to 603-N may also have its own circuitry embedded on it.

Figure 10:
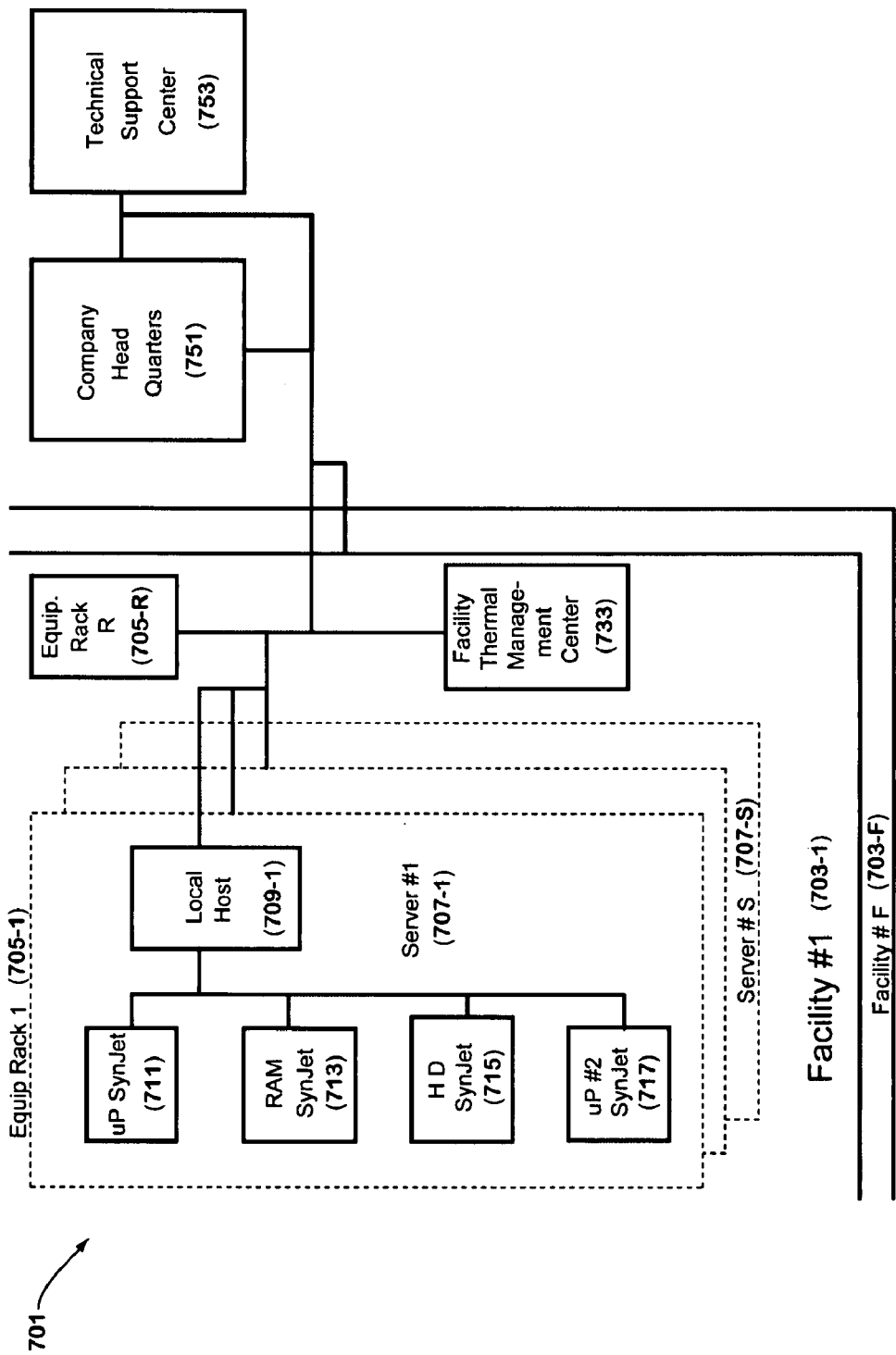
FIG. 10 is an illustration of a thermal management systems support network made in accordance with the teachings herein.

FIG. 10 illustrates one particular, non-limiting embodiment of a system 701 made in accordance with the teachings herein which leverages the infrastructure of a thermal management system based on synthetic jet actuators to gather information about and/or monitor host systems 703-1 to 703-F that this type of thermal management system is embedded into. In this particular embodiment, the host systems 703-1 to 703-F are facilities which comprise one or more equipment racks 705-1 to 705-R, each of which comprises one or more servers 707-1 to 707-S. Each of the equipment racks 705-1 to 705-S comprises a local host 709 which is in electronic communication with a plurality of synthetic jet actuators distributed across the equipment racks 705-1 to 705-R. The number and type of synthetic jet actuators on a given equipment rack may vary. In general, however, a suitable number and type of synthetic jet actuators will be provided on each of equipment racks 705-1 to 705-R to thermally manage any hotspots existing on each rack. Thus, for example, in the particular embodiment depicted, the first equipment rack 705-1 is equipped with first 711, second 713, third 715 and fourth 717 synthetic jet actuators. The first synthetic jet actuator 711 is adapted to cool a first microprocessor, the second synthetic jet actuator 713 is adapted to cool the server's RAM, the third synthetic jet ejector 715 is adapted to cool a hard disk, and the fourth synthetic jet actuator 717 is adapted to cool a second microprocessor.

As will further be appreciated with reference to FIG. 10, the R equipment racks 705-1 to 705-R are part of a first host facility 703 which further comprises a facility thermal management center 733. The system 701 comprises a plurality of host facilities 703-1 to 703-F, wherein each of the F facilities, which may be similar or distinct, are equipped with a thermal management system of the type depicted in host facility 703-1. Each of the F facilities 703-1 to 703-F are in communication with company headquarters 751 and/or with a technical support center 753, the latter of which will preferably be in communication with company headquarters 751.

By its very nature, the system 701 depicted in FIG. 10 is designed to have localized synthetic jet ejectors near the hot spots of each device in each of the equipment racks 705-1 to 705-R disposed in each of facilities 703-1 to 703-F. Because of its distributed nature, in addition to providing thermal management for a variety of devices in the host systems 703-1 to 703-F into which it is incorporated, the system may be leveraged to provide various data acquisition functionalities. For example, each of the synthetic jet ejectors may be equipped with a thermal sensor, a tachometer sensor, a voltage sensor, a photo detector, a magnetic sensor, an electrical sensor, or the like, and the data gathered by these devices may be communicated to the local host 709. This data may be accessible remotely at company headquarters 751 or at the technical support center 753 where it may be monitored, for example, to ensure that the various systems within a particular facility are functioning properly.

The system also permits the various components of the host system and/or thermal management system to be queried for status and other information. For example, data regarding the number of cycles that a synthetic jet ejector has experienced over a defined period of time may be monitored for lifetime tests and for maintenance purposes. In some embodiments, a maintenance alert may be sent to systems management when this data indicates that a given synthetic jet ejector is nearing the end of its expected lifetime.

The distributed nature of the system 701 depicted in FIG. 10 is further advantageous in that it allows correlations to be established between hot spots in various equipment racks 705 and/or facilities 703. This may, for example, permit a person or company monitoring the system to identify underlying common causes for component failures. It further permits the implementation of thermal management strategies that take into account the effect that each component of the system has on each other component of the system. For example, the effect that each synthetic jet ejector has on the thermal load being managed by other synthetic jet ejectors in the system may be considered so that the workload may be appropriately distributed across a plurality of synthetic jet ejectors, and so that thermal management may be optimized.

Such a system also permits the implementation of synthetic jet ejector failure algorithms. For example, if a particular synthetic jet ejector within the system fails or malfunctions, the system may be able to compensate for this failure by distributing at least a portion of the thermal load being handled by the failed synthetic jet ejector across neighboring synthetic jet ejectors.

Such a system further permits the implementation of synthetic jet ejector shutdown algorithms. For example, if the system detects that a system component no longer requires cooling, as, for example, if the component has shut down or has reached an acceptable thermal level, the system can deactivate one or more of the synthetic jet ejectors responsible for thermally managing that component, or can reduce the thermal dissipation level and/or the power level at which the synthetic jet ejector is operating. The synthetic jet ejector may be reactivated, and/or its power level may be increased, when sensors indicate that the system component again requires some level of thermal management. By operating in this manner, the thermal management system reduces its own power consumption and contribution to the thermal load to be managed. Various parameter thresholds or logic levels may be used to determine when individual synthetic jet ejectors or groups of synthetic jet ejectors are to be activated or deactivated, or to determine when their power level and/or heat dissipation level is to be increased or decreased.

Figure 8:
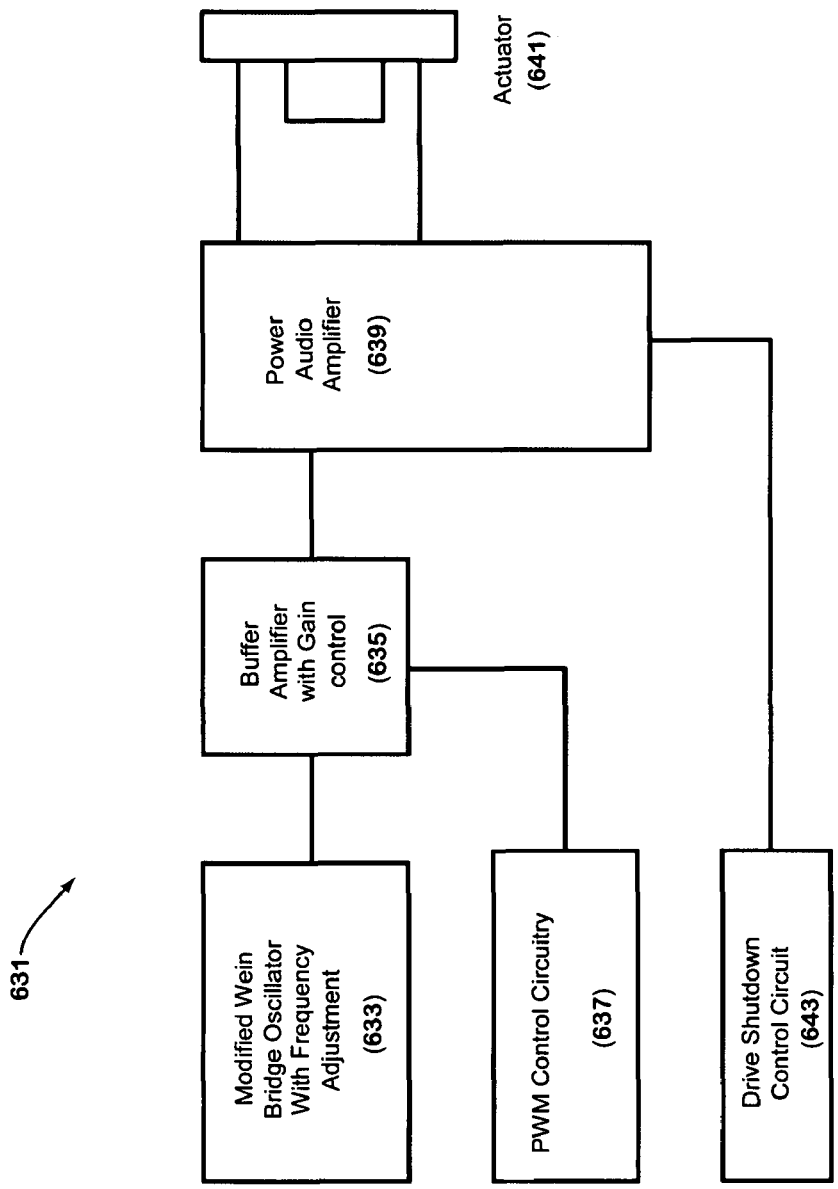
FIG. 8 is an illustration of the electronic configuration of a synthetic jet ejector made in accordance with the teachings herein which features a basic analog implementation with PWM and shutdown control.

FIG. 8 illustrates one particular, non-limiting example of an analog device 631 with pulse width modulation (PWM) and shutdown control that may be utilized in some of the algorithms described above. The device 631 is equipped with a modified Wein bridge oscillator 633 with frequency adjustment that is in electrical communication with a buffer amplifier 635 with gain control. The device 631 is also equipped with PWM control circuitry 637 that is also in electrical communication with the buffer amplifier 635. A power audio amplifier 639 is provided which amplifies the signal it receives from the buffer amplifier 635 and passes it to the synthetic jet actuator 641. The power audio amplifier 639 is equipped with a drive shutdown control circuit 643 to deactivate the synthetic jet actuator 641 when desired.

Figure 9:
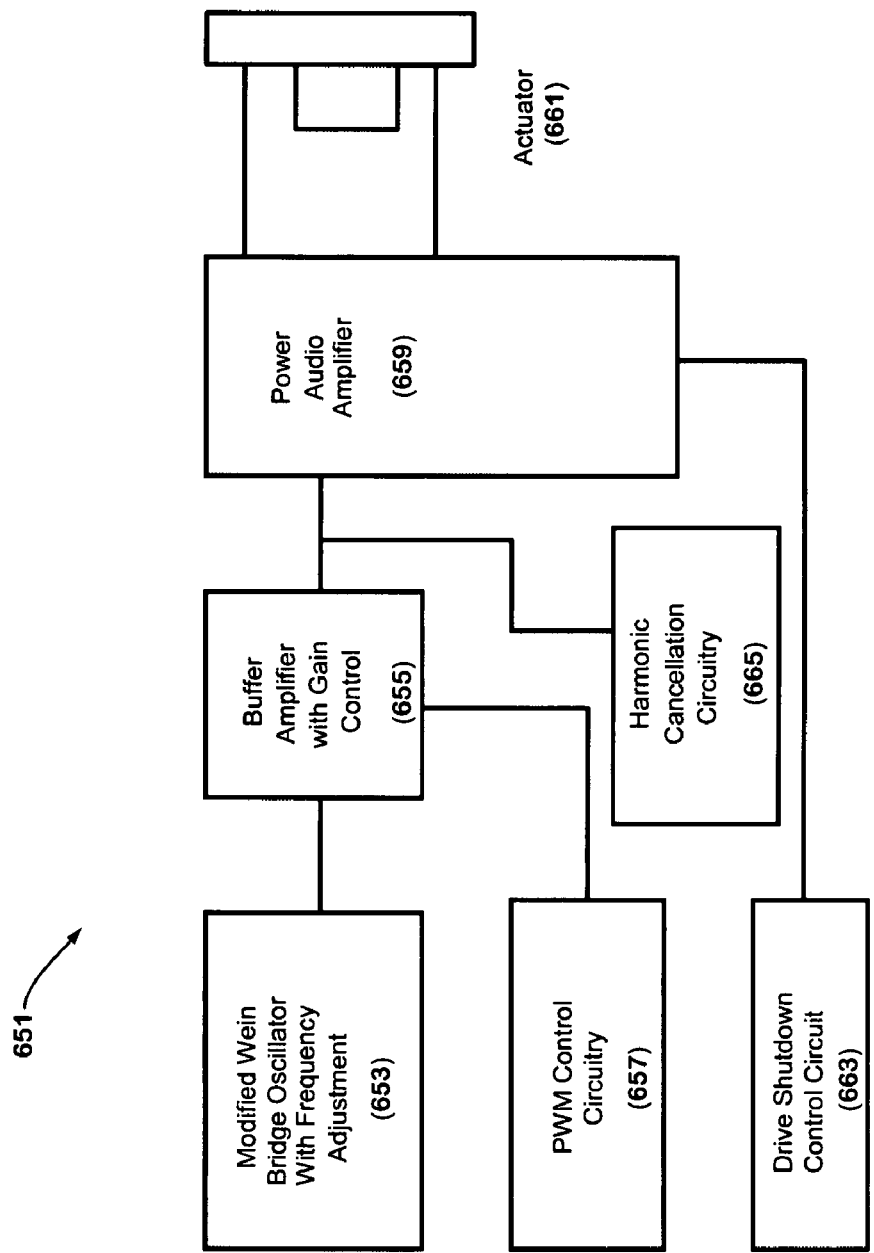
FIG. 9 is an illustration of the electronic configuration of a synthetic jet ejector made in accordance with the teachings herein which features a basic analog implementation with PWM and shutdown control and harmonic cancellation.

FIG. 9 illustrates another particular, non-limiting example of an analog device 651 with pulse width modulation (PWM), shutdown control and harmonic cancellation that may be utilized in some of the algorithms described above. This device 651 is similar in most respects to the device 631 of FIG. 8, but further includes harmonic cancellation circuitry 665 disposed downstream of the buffer amplifier 655 and upstream of the power audio amplifier 659. Some possible harmonic cancellation schemes that may be implemented by the harmonic cancellation circuitry 665 are described in greater detail with respect to FIG. 7.

The system 701 depicted in FIG. 10 may also be adapted to leverage common communications network tools. For example, the company managing the system may provide software and firmware for the synthetic jet ejectors and the devices that control them. The network may be utilized to implement upgrades, fixes, patches, or other changes to the firmware or software and/or perform feature set upgrades. For example, a customer may purchase a maintenance contract that specifies a minimum maintenance plan. The synthetic jet ejectors and other hardware incorporated into the system may be equipped with various functionalities that are turned off because the maintenance plan does not require them. If the customer later wishes to upgrade their maintenance plan, any additional functionality specified in the upgraded plan may be turned on remotely.

The systems described herein may be equipped with synthetic jet ejectors that are adapted to operate at a variety of input voltages. Thus, for example, the synthetic jet ejectors may be adapted for continuous operation at input voltages ranging from 3.3 V to 24 V utilizing either an AC or DC power source. The synthetic jet ejectors utilized in the systems described herein may also be adapted to operate at specific voltages, or sets of voltages, using either an AC or DC power source, and these voltages may be constant or variable. Thus, for example, in a particular system, each of the synthetic jet ejectors may be adapted to operate at 3.3 V, 5 V, 12 V, or 24 V.

The synthetic jet ejectors may also be adapted to operate at a voltage that varies, for example, in relation to the heat load associated with a hot spot or system that must be dissipated. The power source may be either external or internal. In some embodiments, the synthetic jet ejectors may be controlled by a local board that is also equipped with appropriate circuitry to perform any necessary voltage or current adjustments.

In other embodiments, the synthetic jet ejectors may be adapted to plug into a locally available power source. For example, a localized board that controls another device and that requires thermal management may itself be equipped with one or more ports that the synthetic jet actuator can access.

In some of the devices and systems made in accordance with the teachings herein, remote host control may be implemented using Pulse Width Modulated (PWM) input to change the drive amplitude of a synthetic jet ejector. Pulse width modulation is a signal received from the host that has a ratio of on time to off time. This ratio may be utilized by the systems described herein to determine whether a particular synthetic jet ejector, or group of synthetic jet ejectors, should be operating at minimum or maximum thermal management levels (or somewhere in between). Such an approach is especially useful when it is desired to retrofit a system with the thermal management devices of the type disclosed herein. For example, since pulse width modulation is often used to control fans, devices and systems are typically equipped with a cable for importing a pulse width modulation signal. In some embodiments, the systems described herein can be adapted so that they are controlled by the same pulse width modulation signal designed to operate the fan (that is, so that the synthetic jet ejectors emulate the fan), whether or not the device also actually includes a fan. This avoids the need in some embodiments for adding cards, motherboards, or other devices to the system to control the synthetic jet ejectors.

The systems described here may be equipped with closed loop temperature control systems. Such systems operate by sensing temperature at a point of interest and continuously adjusting the drive signal driving the synthetic jet ejectors so that a desired level of thermal management will be attained. Several variations are possible in such an embodiment. For example, the synthetic jet ejectors themselves may be equipped with thermal sensors that provide appropriate feedback to the device controlling the drive signal. The thermal sensors may also be disposed on the device being cooled, on a heat sink in thermal communication with the device, or in other locations. The thermal sensors may be adapted to sense the temperature of the ambient air, the temperature of heat exhaust, and/or the temperature of a substrate. The drive signal may be changed by adjusting, for example, its voltage or frequency level, or both.

In some variations, the synthetic jet ejector may be adapted to switch from a first state in which it is controlled by a global or non-local device, to a second state in which it operates as a closed loop system. Such a switch maybe occasioned, for example, by data received at the board or device controlling the synthetic jet ejector, or from a signal received by the synthetic jet ejector from one or more sensors. The synthetic jet ejector may be adapted to receive an override signal which causes it to switch from the first state to the second state.

The systems and devices described herein can make advantageous use of H bridge circuitry. Such circuitry is extremely energy efficient, and can reduce the contribution of the devices and systems described herein to the thermal management load. For example, if a simple class AB amplifier is used to drive the synthetic jet actuators, the amplifier device will generate a significant amount of heat. By using a class D type of arrangement which is implemented with H bridge circuitry, the contribution of the synthetic jet ejector to the thermal load is significantly reduced. In some embodiments, the resulting efficiency of the amplifier may then approach 90% or greater.

The use in the systems, devices and methodologies described herein of a class D type of arrangement which is implemented with H bridge circuitry has a number of other advantages. For example, the class D H bridge output driver circuit reduces losses in the actuator drive, thereby maintaining high output efficiency. The class D H bridge output driver's low $I^2R$ losses also reduces heat generated by the driver and minimizes driver circuit cooling requirements. Moreover, the class D H bridge operating frequency is well above audio, but well below most high frequency interference sources such as RFI and EMI. Also, class D H bridge devices are small, which reduces the physical size of the circuit or, when integrated into the microcontroller I/C, reduces the package count. As a further advantage, this integration reduces manufacturing and overhead costs, since there is only one (as opposed to two) part to assemble, test and document.

It will be appreciated from the above that the driver circuitry may be in one of at least two places. In particular, in some embodiments, the driver circuitry may be disposed on the actuator itself (for example, on the thermal strip of the actuator), while in other embodiments, the driver circuitry may be disposed at some location external to the actuator. Various hybrids of these setups are also possible. For example, groups of synthetic jet ejectors containing such actuators may be interfaced with each other in such a way, via a proprietary or industry standard serial bus, that a master/slave relationship exists between two or more of the synthetic jet ejectors. In such an embodiment, most or all of the driver circuitry may be disposed on a master actuator, with that actuator controlling the behavior of one or more slave actuators. In other embodiments, the basic driver circuitry or software may be disposed on the actuator, and the actuator may be connected to another board that may represent both the host interface and the common signal source.

In addition, class D H bridges can be duplicated to drive multiple actuators, and to size the drive current to the load current requirements. In such embodiments, total system overhead is typically 5-10 mA when delivering current ranges from 100-400 mA. This results in power efficiencies in the range of 90 to 95%. Furthermore, this solution replaces fans that draw 400 mA to 1.5 A with synthetic jet ejectors that have a much lower profile than a typical fan.

The cost of the systems and devices described herein may be minimized by utilizing a very small number of low cost components, especially active components, to implement the driver circuit. In some embodiments, a fully integrated configuration requires only (a) a printed circuit board, (b) a connector, (c) an integrated circuit, (d) a resistor, and (e) two capacitors.

The devices described herein may be operated in a spread spectrum mode to modulate the PWM signals that drive the H bridge circuitry so as to reduce EMI emissions at any given frequency. In such an operational mode, the drive signal may be modulated over a range of frequencies so that the energy of the drive signal is distributed over that range of frequencies, thereby reducing the total energy allocated to any single frequency. The operational characteristics of the spread spectrum mode may be determined during customer EMI testing, and can be modified, if need be, by doing a firmware update download which may modify, for example, the spread spectrum utilized by the device or the characteristics of that spectrum. In some applications, this approach permits the resolution of EMI issues without removal of the thermal management device or system from the host device or system. The frequencies over which the drive signal is modulated may be determined, for example, by a random number generator or pseudo random number generator.

In a specific, non-limiting example of the aforementioned approach, a customer may conduct preliminary laboratory testing on a prototype of a device equipped with a thermal management system of the type described herein. Such testing may identify an EMI issue. The customer could then download, via the Internet or another network or communication link, a different spread spectrum range or frequency characteristic which may be used to update the firmware of the device so as to resolve the issue. This update may be conducted while the device is under EMI testing so as to verify that the situation has been adequately resolved by the modification. One or more special web sites or network sites may be provided that contain such downloads, and that may also possibly contain various software algorithms and interfaces which permit the customer, or a remote entity, to run various tests on the device so as to ensure compliance with applicable laws and regulations. In some embodiments, the sites may be subscription based, and a user's access to features on the site may be controlled, for example, by the user's subscriptions status or level. The thermal management system may also be equipped with software or firmware that collects data pertaining to the thermal management system and that makes the data accessible to third party software packages for data analysis purposes.

In the systems and devices described herein, the synthetic jet ejector may interface with the driving electronics in a variety of ways. In some embodiments, a board with the driver circuitry disposed thereon may be provided which is integral to the assembly. In such embodiments, wires or interface cables from individual actuators may be terminated on the board. The complexity of these wires or interface cables may vary depending, for example, on the particular application. Thus, for example, in a simple application, two wires may be provided (one for power (which may vary) and one for ground). In other applications, additional wires or cables, such as, for example, a serial port wire or a thermocouple resistor wire (or other suitable wire or cable for temperature sensing), may be provided in addition to the ground wire and power wire.

In other embodiments, circuitry may be provided by the manufacturer of the synthetic jet ejector for incorporation onto a customer's board. In such an embodiment, the synthetic jet actuator housing may be devoid of electronics beyond the necessary cables or wires required to interface with the customer's board.

In some applications, thermal management may be required of a device that does not utilize an industry standard bus. In such applications, a bus may be provided for use with the devices and systems described herein that resembles or simulates an industry standard bus. The systems and methods described herein may also be adapted to run off of, or interface with, industry standard buses, such as the power management bus (PMBUS™). Suitable use may be made of prefix codes and code charts to facilitate such an interface, and the protocols unique to a particular type of bus may be among the items downloadable as software or firmware modules.

The systems and devices described herein may also be adapted for remote host control over a serial bus, including proprietary or custom buses and, as noted above, may also support other industry standard buses such as the PM bus based. The interface may be based, for example, on the Philips $I^2C$ or SPI hardware levels.

In some embodiments of the systems and devices described herein, the synthetic jet actuators may be adapted to operate in a passive actuator harmonic cancellation mode, wherein the drive signal is modified to subtract, for example, the 1st and 2nd harmonics from the signal so as to minimize audible harmonics from the previously characterized actuator(s). Such a mode of operation can result in a substantial reduction in audible frequencies emanating from the device. Such a harmonic cancellations scheme may be based, for example, on testing conducted to determine audible frequencies that are typical of the device or of a particular manufactured lot of the devices, or may be tailored to the audible frequency signatures of a particular device. The harmonic cancellation scheme may be programmed, for example, into the firmware controlling the device.

In other embodiments of the systems and devices disclosed herein, the synthetic jet actuators may be adapted to operate in an active or dynamic actuator harmonic cancellation mode in which the actuator takes a waveform signal from a microphone (such as the system microphone) and subtracts harmonics detected from the drive signal to minimize audible harmonics due to the actuator's current operational condition.

Figure 7:
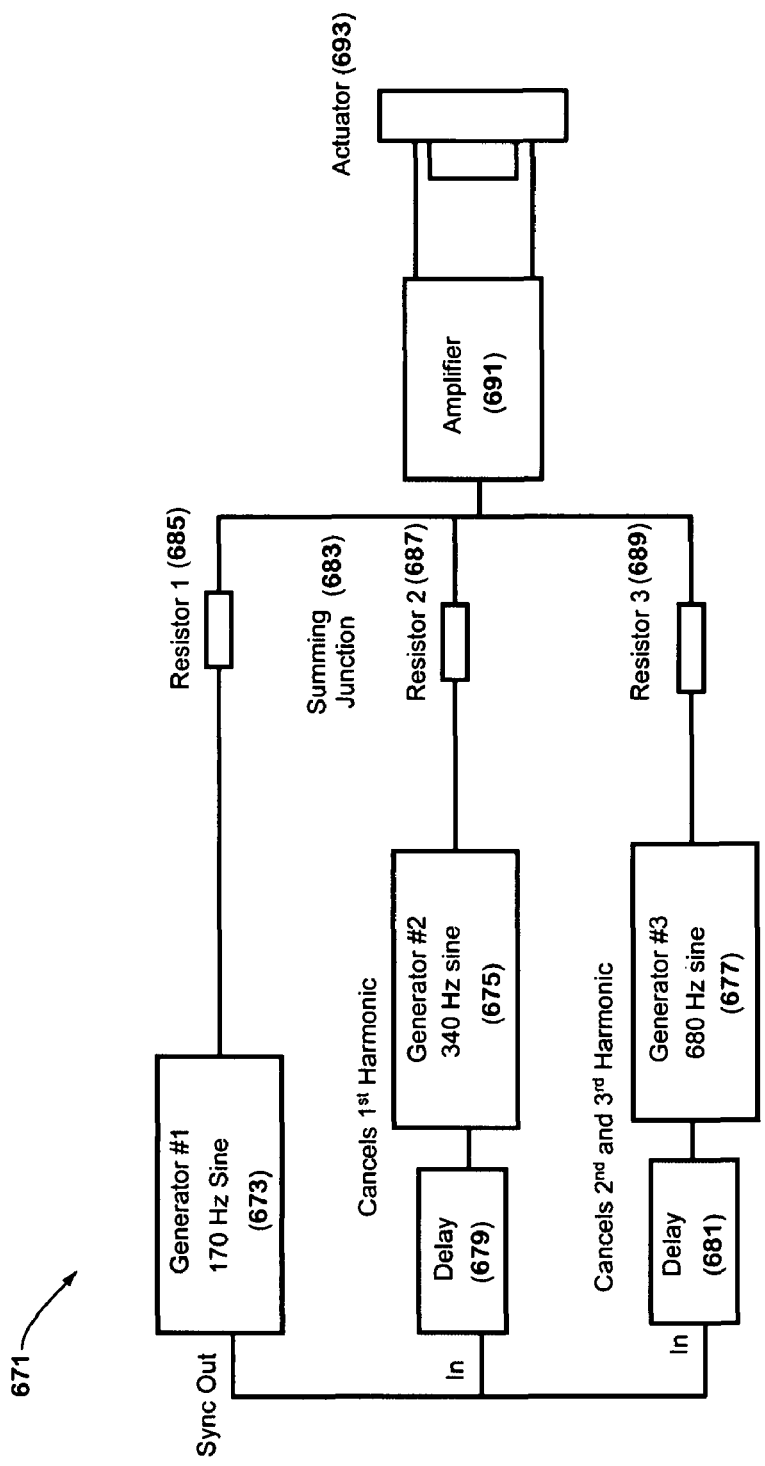
FIG. 7 is an illustration of the electronic configuration of a synthetic jet ejector made in accordance with the teachings herein which features analog harmonic cancellation and digital waveform generation.

FIG. 7 illustrates one possible, non-limiting embodiment of a harmonic frequency cancellation scheme that may be used in the systems, devices and methodologies described herein. In the scheme 671 depicted therein, first 673, second 675 and third 677 generators are provided that are adapted to generate sine waves at 170 Hz, 340 Hz and 680 Hz, respectively. First 679 and second 681 delays are provided for the second 675 and third 677 generators, respectively. A summing junction 683 is provided through which the signals of the first 673, second 675 and third 677 generators are combined after passing through first 685, second 687 and third 689 resistors, respectively. The combined signal is then passed to an amplifier 691 and then to a synthetic jet actuator 693.

In operation, the first delay 679 and the second generator 675 cancels the first harmonic of the signal generated by the first generator 673. Similarly, the second delay 681 and the third generator 677 cancels the second and third harmonics of the signal generated by the first generator 673. Once the desired harmonic cancellation is achieved, the waveform at the summing junction 683 is digitized and the resulting file is used as a waveform source to load the waveform table in the flash ROM of a digital controller integrated circuit. Hence, the harmonic cancellation scheme 671 depicted in FIG. 7 effects analog harmonic cancellation and digital waveform generation.

In still other embodiments, two or more synthetic jet actuators may be adapted to communicate with each other so that they can adjust their resonance frequencies with respect to each other so as to minimize or eliminate audible frequencies. For example, if it is determined that two or more synthetic jet actuators are operating at resonance frequencies that are sufficiently close to each other so as to cause constructive interference of the type that generates audible harmonics or beat frequencies, the system may be adapted to change the operating frequencies of the synthetic jet actuators so that they are sufficiently synchronized or different in frequency to avoid the generation of undesirable audible harmonics or beat frequencies.

The system may be equipped with various algorithms and software packages that permit it to adjust the resonance frequencies such that audible frequencies are minimized to the extent permitted by the thermal load that must be dissipated. Hence, for example, the system may be configured to operate in an actuator operating frequency adjustment mode wherein the resonance frequency of an actuator is located (lowest current point) and the operating frequency is periodically adjusted as required to maintain optimum performance and operating efficiency. Such an embodiment may be particularly suitable for applications in which a system or device is subjected to significant changes in its physical environment, or simply to compensate for the effects of aging on the synthetic jet actuators. The systems and devices described herein may also be adapted to operate in a built-in self test (BIST) mode in which the integrity of the thermal management solution driver and actuator circuits are tested at power up. The tests may be adapted to test the physical, electrical, or operational integrity or functionality of the driver and actuator circuits, and may be further adapted to determine, for example, whether an actuator or cable is open. The BIST mode may also include tests to evaluate actuator current (changes in the actuator current may indicate, for example, that one or more synthetic jet actuators are malfunctioning), memory (for example, the memory in the power microprocessor that controls the synthetic jet actuators), temperature sensors, firmware checksum, bus connections, input voltage, and other such parameters.

Errors may then be reported to the host, to the user, or to maintenance personnel or a maintenance center by various means. These include, for example, sending an error message to the host over a bus, turning a tachometer signal off, or causing the actuator or another device to emit a predefined audio signal such as a beep pattern. In some embodiments, the pattern may identify the type of failure that the system has experienced. In other embodiments, the failure may be noted by other means, as through the use of LED indicators or by displaying an error message on a startup screen or other medium. The errors may also be logged for consideration during future maintenance operations.

In some variations of this embodiment, if the BIST identifies one or more errors, the system may be configured to adopt an optimization strategy such that the system compensates, to the extent possible, for the error or defect that has been detected. Thus, for example, if the system detects that a synthetic jet actuator is malfunctioning or is not functioning at all, it may adjust the operating frequencies of the remaining synthetic jet actuators to distribute the thermal load, to the extent possible, over the remaining properly functioning synthetic jet actuators and/or the fan system or other thermal management devices.

The systems and devices described herein may also be adapted to operate in a performance monitoring mode in which the system maintains a data log of performance parametric changes that may be used to indicate adjustments needed to maintain performance levels or to make "time to end of life" assessments. Some non-limiting examples of possible performance parametric changes include, for example, actuator impedance or operating current, actuator harmonics, actuator sound pressure (as determined, for example, by a microphone), BIST failures, maximum temperature measured, and minimum temperature measured.

The on-board monitoring capabilities achievable with the systems and devices described herein facilitates and, in some cases automates, problem identification and solving, since the history log that is kept by the driver controller or in the supported host usually contains the data needed to identify and correct the problem. In other cases, this information will indicate that action is required to correct the problem, and may identify the specific action required. For example, if the input air fan fails, the synthetic jet actuator may be adapted to notice the change in temperature (in which case it may be further adapted to notify the host). The synthetic jet actuator may also be adapted to receive notification from the host system of the failure. The synthetic jet actuators can then adjust to increase cooling until the failed fan is physically replaced.

The on-board monitoring possible with the systems and devices disclosed herein makes it possible to use synthetic jet ejectors as elements in a networked thermal data acquisition system without the need for additional external equipment, thermocouples, or the like. This ability allows thermal engineers to verify overall system thermal performance quickly and easily during system design, deployment and maintenance. Thus, for example, during product or system development, this feature can be used to obtain information about the heat generating elements of the host system, thus avoiding the need for complex external instrumentation to obtain that data.

This ability also provides a stable, closed loop thermal system that can automatically adjust to changing thermal conditions anywhere in the system, and that can also adjust to different system configurations. For example, it may be necessary to take a single server or an entire rack off-line for maintenance or repair. The changes in thermal management requirements as a result of this maintenance may be compensated for automatically by each synthetic jet actuator, or by groups or assemblies of synthetic jet actuators. In some applications, as with telecommunication racks that employ hot swapping abilities that affect the thermal management requirements as cards are added to, or removed from, an equipment rack, these changes will be automatically compensated for and can be monitored by the host system without the equipment personnel having to actively manage the thermal management system.

The systems and devices described herein may also be adapted to operate in a performance optimization mode in which they use one or more parameters, such as temperature, actuator current, harmonic information, and sound pressure measurements, to establish and to periodically optimize thermal and acoustic performance of a synthetic jet actuator. Synthetic jet actuators on a bus may be adapted to coordinate with other synthetic jet actuators and with other supported bus devices (including those in nearby equipment racks) to achieve total system thermal optimization. When the system is operating in this mode, the synthetic jet actuator output signal may be modified by changing amplitude, frequency, on time, or spectral composition to achieve optimum thermal, acoustic, and power efficiencies.

In some embodiments, when the system is operating in the performance optimization mode, the system may also be adapted to coordinate or communicate with the room air conditioning controller and other such devices or systems that can modify the ambient environment. For example, a communications link may be established between the system and the room air conditioning controller so that the system will be apprised of the current room temperature settings and any programs currently activated in the room air conditioning controller that will modify those settings. For instance, the room air conditioning controller may be programmed with daytime and nighttime settings that have maximum and minimum temperatures associated with each setting, and the thermal management system may be adapted to use this information to make appropriate compensation.

The systems and devices described herein may also be adapted to operate in an upgrade mode. This mode permits the driver controller firmware to be changed to install the latest version of the firmware, or add new features to the product while still in the application. This upgrade may be accomplished via a direct connection to the synthetic jet actuator, the synthetic jet actuator host, or via the Internet.

There are at least 3 types of up-grades/downloads that may be available in various embodiments of the systems and devices disclosed herein: (a) upgrades to fix bugs or to improve device performance or compliance with agency or industry standards; (b) optional extra cost upgrades to add features and/or host drivers needed to implement proprietary buses that may be utilized to allow the thermal management system to communicate with the host or that may be needed to implement other supported industry buses (these may include thermal monitoring and thermal system management programs that provide control and status of the entire interconnected "bused" or networked system); and (c) downloads to support standard catalog synthetic jet ejector products for "design-in" support, and customer monitors to verify and track synthetic jet ejector status and performance in the customer's device.

The upgrade functionality possible with the systems and devices described herein permits the systems and devices to be upgraded in situ. Consequently, the systems and devices may be upgraded to add functionality and features without the need for any mechanical alterations. Some of these additional functionalities and features have been noted above and may include, for example, access to subscription based content, enhanced communication between the components of the systems and devices, or components to support specific catalog products.

This feature may also be utilized by system designers to customize the thermal management system to the host system. For example, the system designer can create software packages that include specific firmware upgrades (e.g., to implement the bus), .dll files, software modules, and the like that can be downloaded to the thermal management system and that enable the system designer to customize the features of the thermal management system to better fit the specific applications that the host is being utilized for.

It will also be appreciated that the upgrade functionality possible with the systems and devices described herein enables or facilitates a variety of business methods and systems. For example, one or more business entities may be established that provide various software or firmware upgrades or components for the thermal management systems described herein. A systems designer may establish an account with these business entities so that the designer can create upgrade packages for the thermal management system in an ala cart fashion. Consequently, the systems designer can essentially retrofit the thermal management system in situ so that it is equipped with a desired set of functionalities or features.

Programmability facilitates modification of the design or feature set, without impacting hardware or the manufacturing process used to make the thermal management system and its components. The assembly may be programmed at test to include a feature set and bus support ordered by the customer. This reduces the time required to implement demonstration models for new customers, and as a result reduces new product time-to-market.

As noted above, this capability also enables devices to be upgraded in the field, while still connected in the circuit. Devices in host systems that are connected to the Internet can be updated or upgraded via the internet. Thus, for example, the output switching frequency or spread spectrum parameter of the H bridge circuitry could be changed while the device is installed in a host connected to the Internet. In some situations, this may allow EMI issues to be fixed in a matter of minutes regardless of the customer's location, and may be performed while the customer is performing EMI testing to obtain the required CE product certification.

Since device feature sets are essentially downloaded into the same I/C, business entities that provide feature components for the system may utilize a pricing structure that is feature based rather than cost based, which may enhance product margins. In some cases, this will enable the business entities to generate revenue when customers decide to add features via a product firmware up-grade, without having to manufacture a device (e.g., by simply downloading the requested "optional feature set" firmware into the customer's existing installed thermal management system).

A method is also disclosed herein for an enhanced and corrected sign wave drive signal for harmonic distortion reduction and cancellation when driving an air moving actuator (speaker) with a single drive frequency for thermal management and controlled turbulent flow applications.

In some embodiments of the systems and devices disclosed herein, an air moving actuator or speaker and may be driven with a single drive frequency, especially in thermal management and controlled turbulent flow applications. As the (typically single frequency) sign wave signal driving the actuator is increased in amplitude, the displacement (motion) of the actuator and the resultant acoustic output gives a less and less accurate reproduction of the drive signal, that is, the input to output relationship changes from a linear relationship to a nonlinear relationship. This nonlinearity can cause multiple harmonics of the single input frequency to be generated in the output displacement, which in turn causes a reduction in the air flow and a concomitant reduction in the effectiveness of the air flow in implementing thermal management. Such nonlinearities also cause a number of objectionable tones to be generated that can render the product unacceptable based on its acoustic footprint in customer applications.

A number of factors may contribute, either individually and/or through (sometimes complex) relationships, to the creation of such nonlinear effects. Some of these factors include asymmetries and/or non-uniformities in the magnetic field in the gap; asymmetries in coil position and/or movement; changes in the stiffness (i.e., spring constant equivalent) of the diaphragm and/or surround materials with temperature or age, or across a production lot; interaction of the coil magnetic field of the device with the permanent magnetic field of the device; and asymmetric forces arising from variations in tinsel attachment and/or in the adhesive attachment of the diaphragm and surround assemblies.

This drive signal distortion may be corrected in at least two different ways. The first approach utilizes an initial measurement scheme in which actuator displacement measurements and measurements of differences between drive signal amplitude and actual displacement (or between drive signal amplitude and a related surrogate signal) are made when the synthetic jet actuators are manufactured. These measurements are then used to calculate a baseline correction values table. The data in this table typically represents a sine wave when it is corrected or reshaped, although the approach described herein is equally applicable to an arbitrarily shaped waveform that is to be corrected.

The correction table is then loaded into the firmware of the actuator driver electronics and is used to create or provide the corrected drive signal to the actuator. This table may be modified periodically, or dynamically, to account for temperature fluctuations, age of the device, software and hardware updates, and the like, or to reflect other corrections provided from local sensors, from a host source, or from on-board elapsed time determinations used in conjunction with known aging curves.

In this approach, the correction table may be specific to the actuator, although embodiments are also possible wherein unit-to-unit variations are sufficiently small (and/or wherein acceptable performance tolerances are sufficiently wide) to allow a single correction table of values to be developed for each production lot or for each type of actuator. Hence, this approach may be implemented as an essentially open loop control approach which uses the initially measured values in the correction table as a best estimate that is used to correct or optimize the output of the synthetic jet actuator for the service life of the device.

Figure 11:
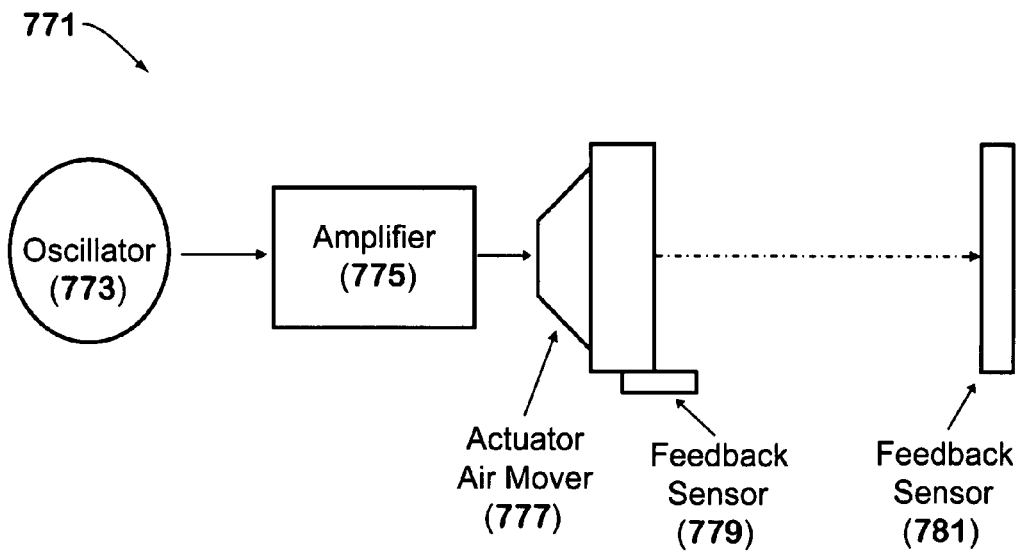
FIG. 11 is an illustration of an actuator correction system which utilizes an initial measurement scheme that may be utilized to determine corrected tables of values for a given actuator or lot of actuators.

FIG. 11 is a schematic illustration of one particular, non-limiting embodiment of a device that may be utilized in an initial measurement scheme. The device 771 includes an oscillator 773, an amplifier 775, an actuator air mover 777, and feedback sensors 779, 781. An actuator to be tested is inserted between the actuator air mover 777 and the sensors 779, 781. The oscillator 773 may be a single frequency audio oscillator or an analog oscillator. The oscillator 773 may also be a microprocessor which outputs a sine wave or other function through a digital-to-analog converter.

The feedback sensors 779, 781 output a feedback signal which is related to the diaphragm position and/or velocity within the actuator. The feedback signal may be generated through the use of one or more of the sensor configurations described herein. The connections between the sensor and the diaphragm within the actuator may be mechanical, electrical or pneumatic. In use, the device 771 is utilized to determine a corrected table of values that are loaded into the actuator control system during production. This table may be unique to each actuator, or it may be common to a particular production lot of actuators or type of actuator.

Figure 12:
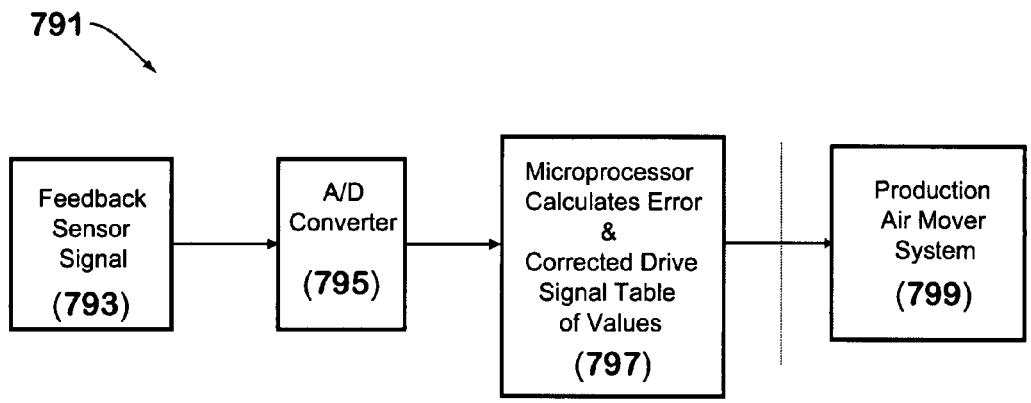
FIG. 12 is an illustration of an actuator correction system which utilizes an initial measurement scheme that may be utilized to determine corrected tables of values for a given actuator or lot of actuators, and in which the tables are updated periodically.
Figure 13:
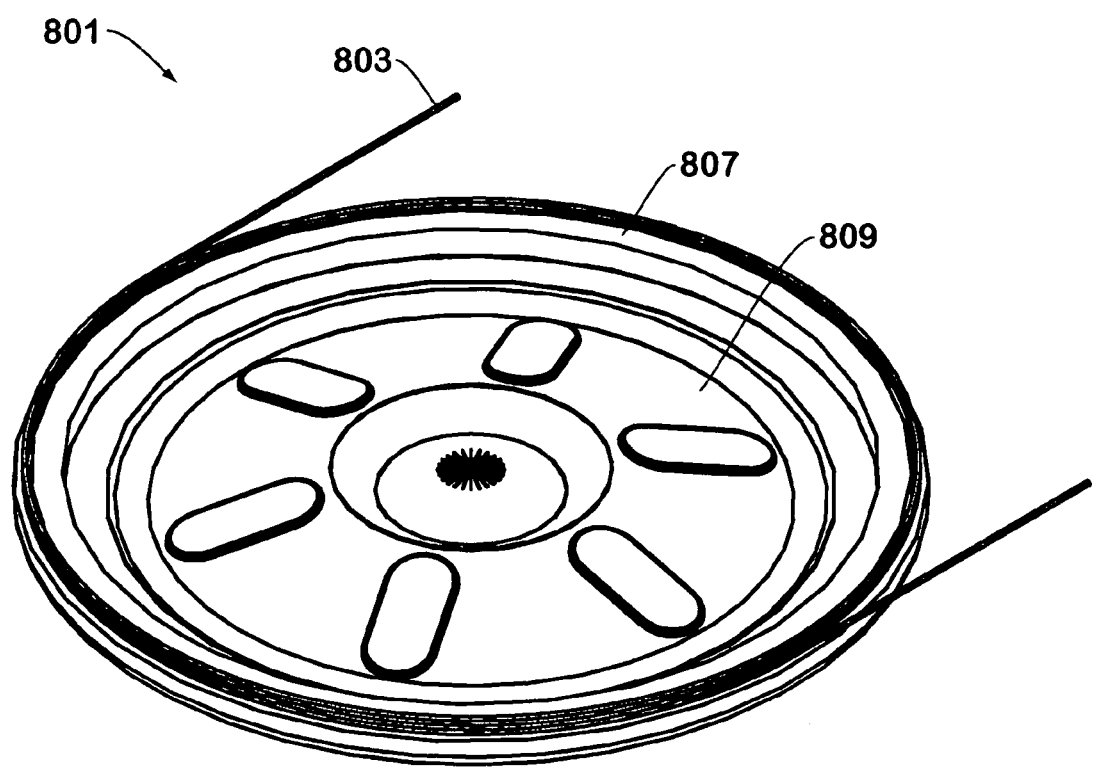
FIG. 13 is a perspective view of a coil sensor which may be used in the systems and devices described herein.
Figure 14:
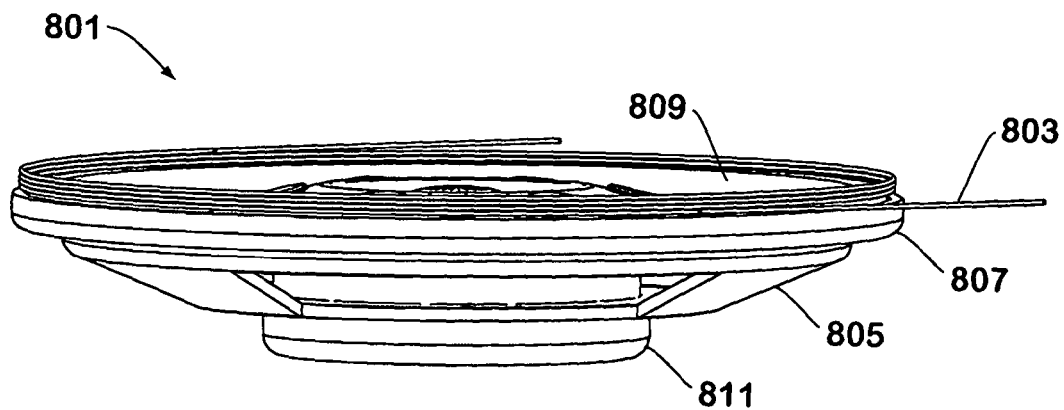
FIG. 14 is a side view of the coil sensor of FIG. 13.

A second approach that may be used with the systems and devices described herein features the use of a dynamic feedback of a signal which is representative of the motion of the diaphragm. One particular, non-limiting embodiment of such a feedback scheme is depicted in FIG. 12. In the system 791 depicted therein, a feedback sensor 793 is utilized to provide a feedback signal to a microprocessor 797 by way of a digital-to-analog converter 795. As with the device depicted in FIG. 11, in the system 791 of FIG. 12, the feedback signal may be related to the diaphragm position and/or velocity within the actuator.

The microprocessor 797 compares the feedback signal 793 from the feedback sensor to the input drive signal to calculate any error present and to generate a corrected drive signal table of values. This information is then utilized to create an error signal, which in turn is used to calculate or create a corrected drive signal for the actuator. This signal is then transmitted to the Production Air Mover System 799.

It will be appreciated from the above that this approach may be implemented as an essentially closed loop feedback control system for correcting the single frequency drive signal. This solution may also include a number of the slowly changing environmental and host inputs to the correction table as noted in the previous approach described above. However, the basic control is dynamic and is run off of, for example, the closed loop feedback from the motion sensor on each cycle or series of cycles.

In the approaches described above, the feedback signal utilized in the calculation of the error in the correction may be derived from several types of sensors which may be located in any of several locations. Suitable sensor types may include, but are not limited to, sensors for measuring the current running through the coil of the device, sensors for determining voltage output from a second coil which may be added to the former coil along with the drive coil, piezoelectric motion or voltage sensors disposed on the rim of the basket or at another nearby location, and optical position or velocity sensors. One or more sensors of the same or different type may be used on a specific actuator with the signals (magnitude, wave shape, time variations, phase relationships, and/or changes) mixed to obtain an optimum position or velocity feedback signal for use in the correction calculation.

The generation of the corrected drive signal and overall control/operation may be implemented using a purely analog system for the sensing, calculations, control, and drive. It may also be implemented using a primarily digital system, or with a mix of analog and digital components along with software.

Various hybrids of the two approaches mentioned above are also possible. For example, rather than implementing the solution as a closed loop system (which responds dynamically and hence requires considerable processor resources) or an open loop system in which the system or device is pre-corrected at the point of manufacture, the system or device can be configured to correct for changes periodically (for example, every cycle or every x number of cycles).

Various techniques may be utilized in the devices and systems described herein for sensing the displacement and velocity of a vibrating diaphragm in a synthetic jet actuator for use as a feedback signal that may be used to control or monitor the performance of the device as it is used for the creation of an airflow for thermal management or for controlled turbulent flow applications.

In order to optimize the performance of the actuator with respect to several key parameters, such as harmonic distortion, power consumption, maximum displacement, and velocity and displacement variations over time (these include short term variations that are experienced during a particular cycle or small number of cycles, and long-term variations that occur, for example, as a result of temperature variations and materials properties aging), it is necessary to have a mechanism to provide a feedback signal from one or more sensors to a control circuit or other such device that contains information relating to the diaphragm position, displacement and/or velocity as a function of time.

This need may be met in a number of ways, some of which are described below. In these solutions, the sensors may be employed individually (i.e., one per diaphragm), with multiple sensors of the same or different types per diaphragm, or through the use of one or more sensors that are used temporarily in initial factory measurements to obtain key displacement data in place of the information relating to a particular diaphragm.

Figure 15:
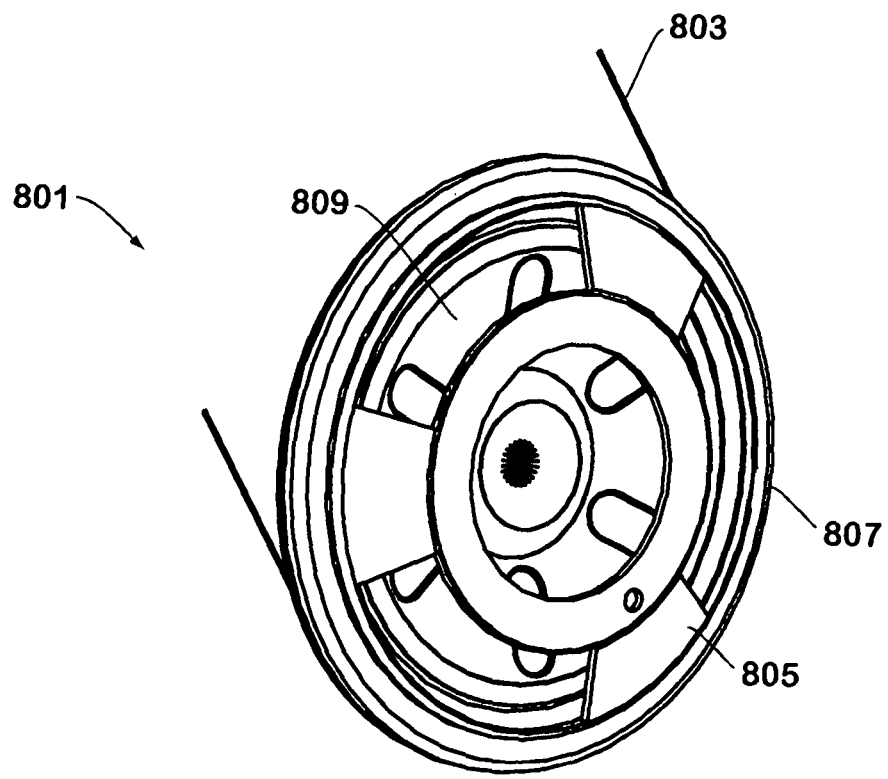
FIG. 15 is another perspective view of the coil sensor of FIG. 13.
Figure 16:
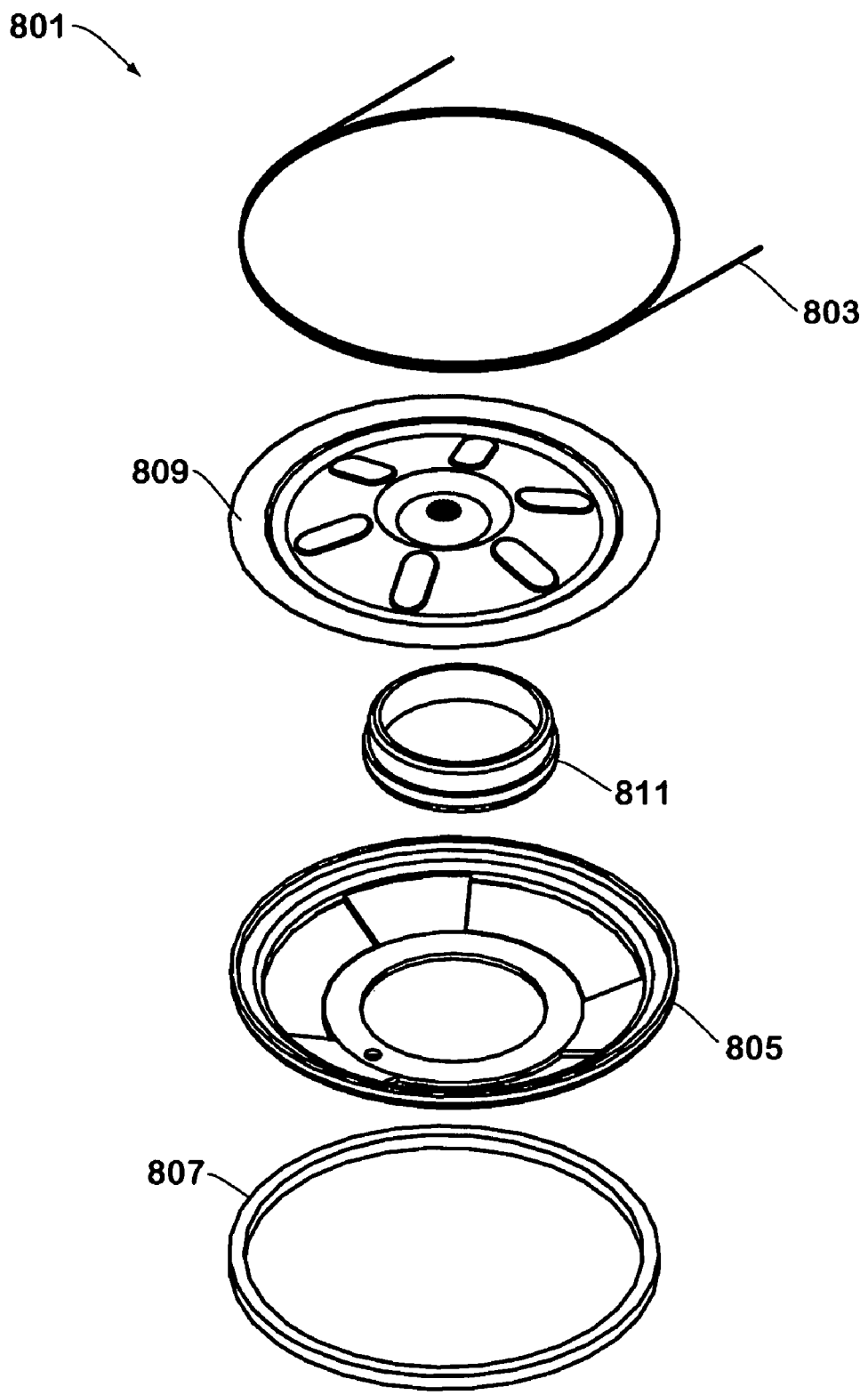
FIG. 16 is an exploded view of the coil sensor of FIG. 13.
Figure 17:
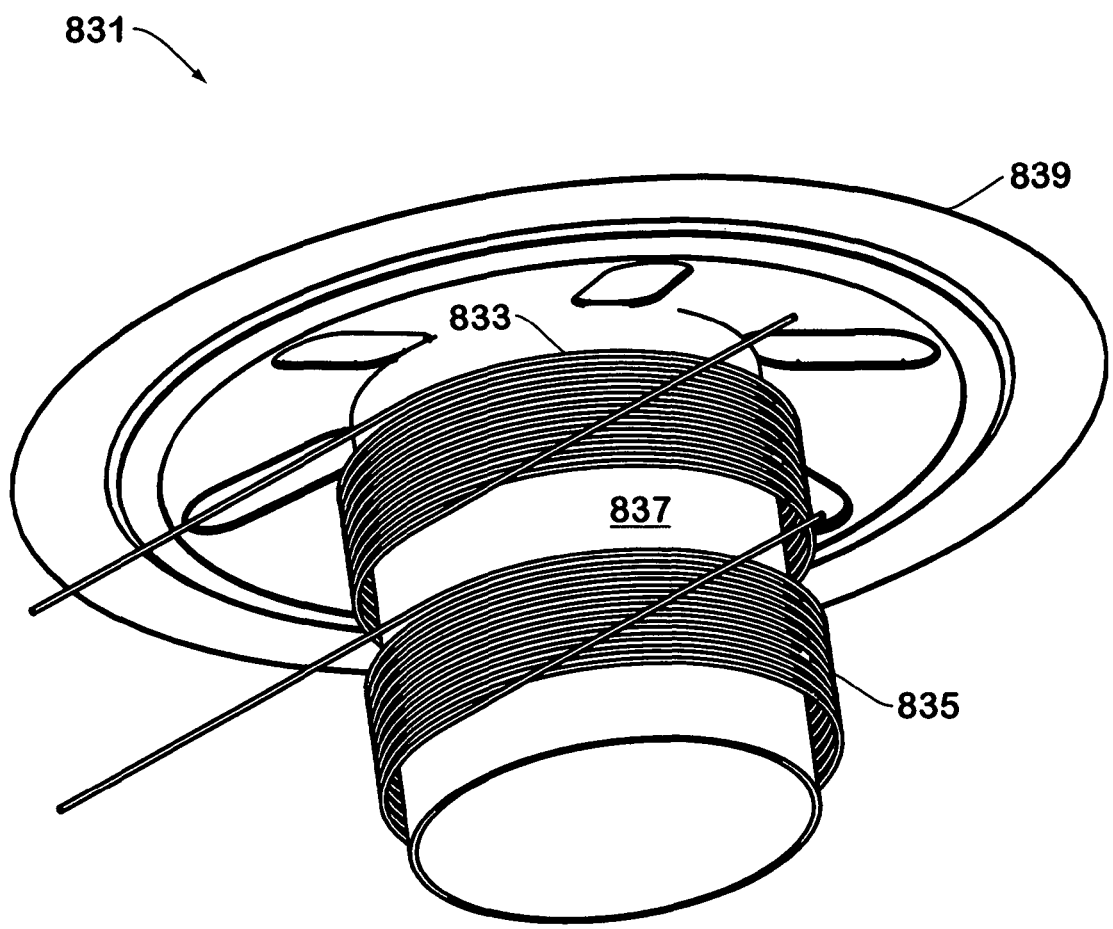
FIG. 17 is a perspective view of a dual coil sensor which may be used in the systems and devices described herein.
Figure 18:
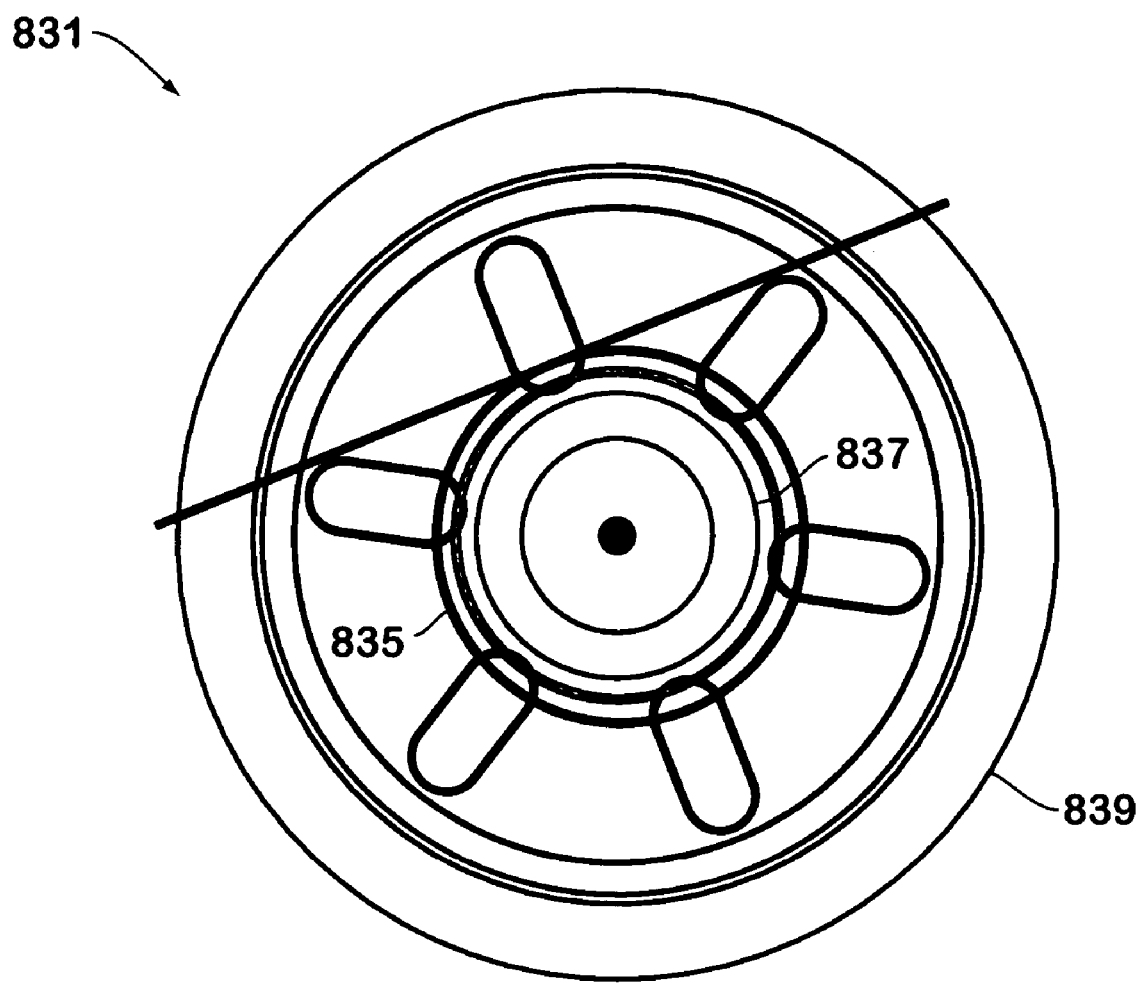
FIG. 18 is a bottom view of the coil sensor of FIG. 17.
Figure 19:
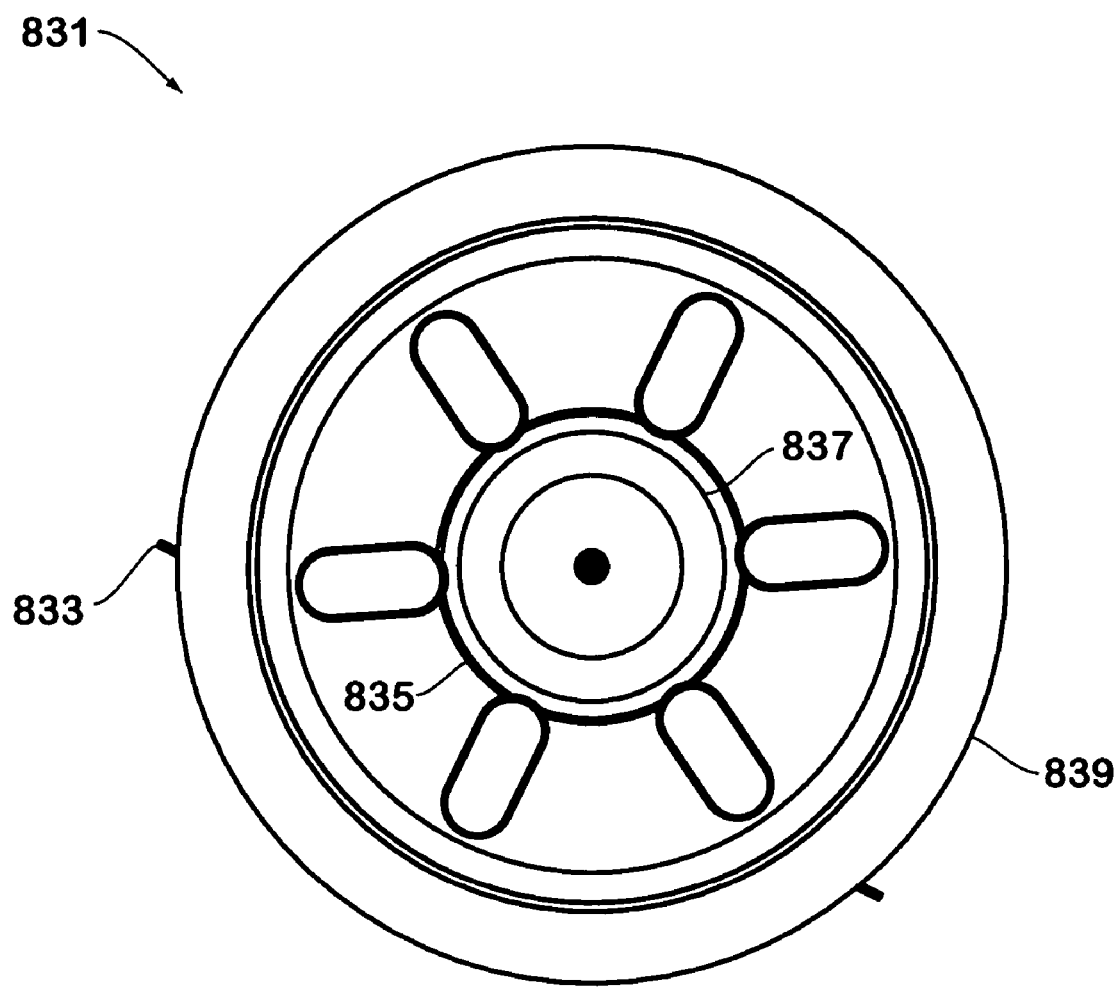
FIG. 19 is a top view of the coil sensor of FIG. 17.
Figure 20:
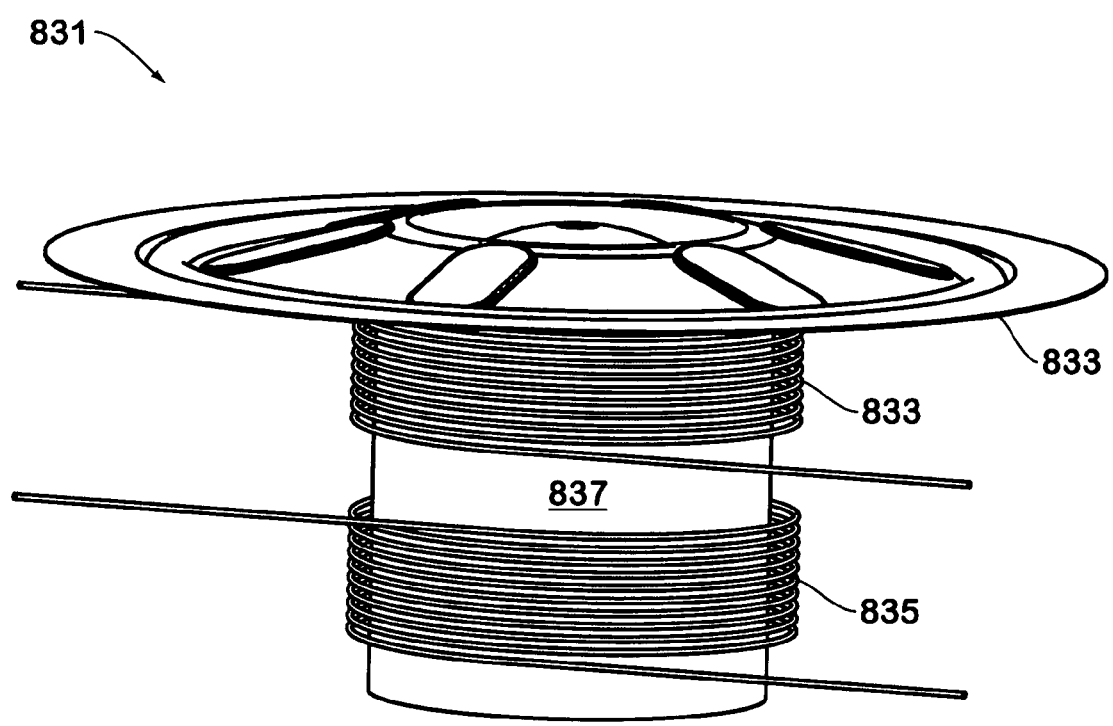
FIG. 20 is a perspective view of the coil sensor of FIG. 17.

In one possible approach, of which a particular, non-limiting embodiment is depicted in FIGS. 13-16, a sensor 801 is provided which is in the form of a coil 803 of wire that is located on the rim or edge of a speaker assembly that will typically include a basket frame 805, a suspension 807, a diaphragm 809, and a magnet 811 (note that the magnet 811 has been removed from FIG. 15 so that the interior of the speaker assembly is visible). The coil 803 may be mounted on the basket frame 805, on the suspension 807, or in any position in this area that is generally close to the periphery of the diaphragm 809. The diaphragm 809 may be circular, oval, rectangular or any other geometric shape which is optimized for a specific thermal management application. The coil 803 may be, for example, a metal wire or ribbon loop of single or multiple turns. This coil 803 senses the changes in the magnetic field as the diaphragm 809 is driven and moves up and down.

In another possible approach, one particular, non-limiting embodiment of which is depicted in FIGS. 17-20, the sensor 831 comprises a drive coil 833 and a sense coil 835 which are wound around the former 837 of a synthetic jet actuator. The drive coil 833 and the sense coil 835 may be the same or different, and may comprise, for example, a metal wire or ribbon loop of single or multiple turns. The former 837 is typically a hollow cylinder and is attached to the diaphragm 839 for transmission of force to drive the diaphragm 839. It will be appreciated that the sensor 831 may be further equipped with other components known in the art which are used in speaker assemblies and the like, although these components have been omitted for clarity of illustration.

The sense coil 835 senses the changes in magnetic field as the diaphragm 839 is driven by the drive coil 833 in a direction perpendicular to the longitudinal axis of the former 837. The voltage induced in the sense coil 835 by the changing magnetic field is related to the motion of the diaphragm 839. This varying voltage is utilized as the feedback signal. Although the sense coil 835 is depicted as being the lower of the two coils in this particular embodiment (that is, the coil farthest from the diaphragm 839), it will be appreciated that either the drive coil 833 or the sense coil 835 may be the upper or lower coil. Embodiments are also possible in which a first of the two coils is wound on the former and the second of the two coils is wound on the first coil.

Figure 21:
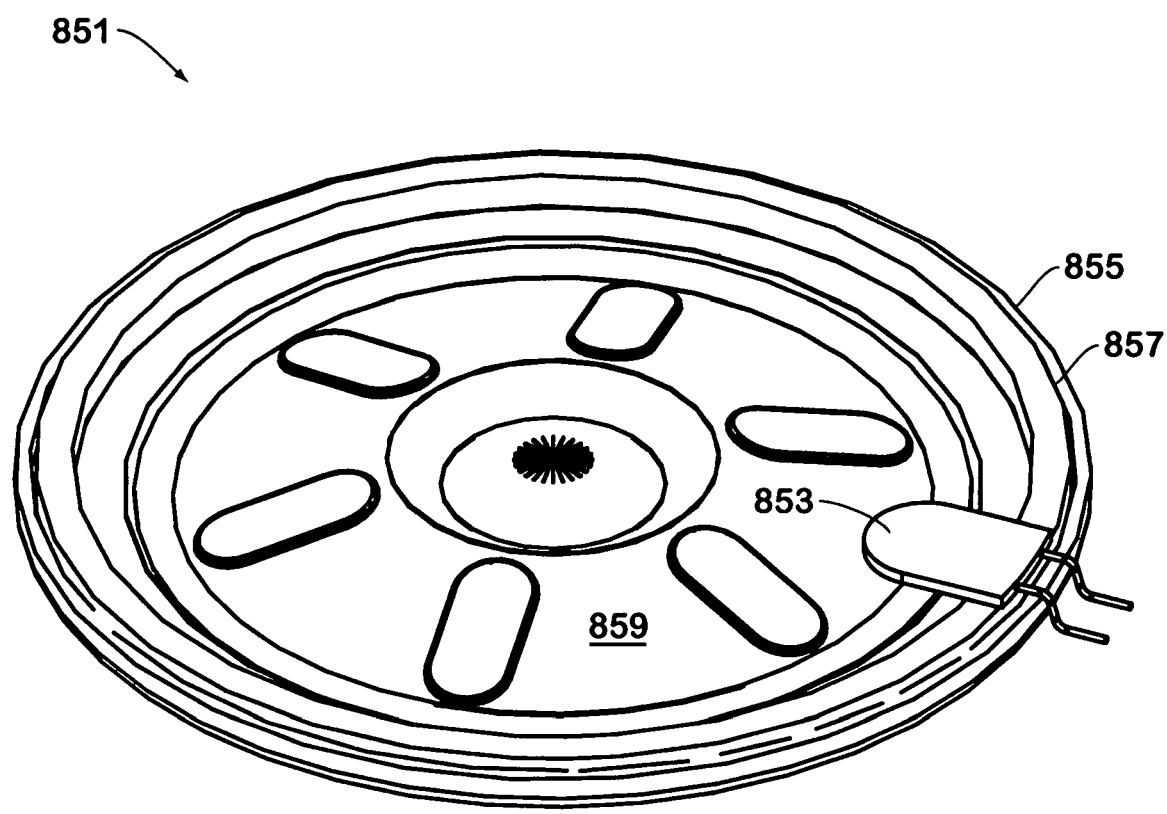
FIG. 21 is a perspective view of a piezoelectric sensor which may be used in the systems and devices described herein.
Figure 22:
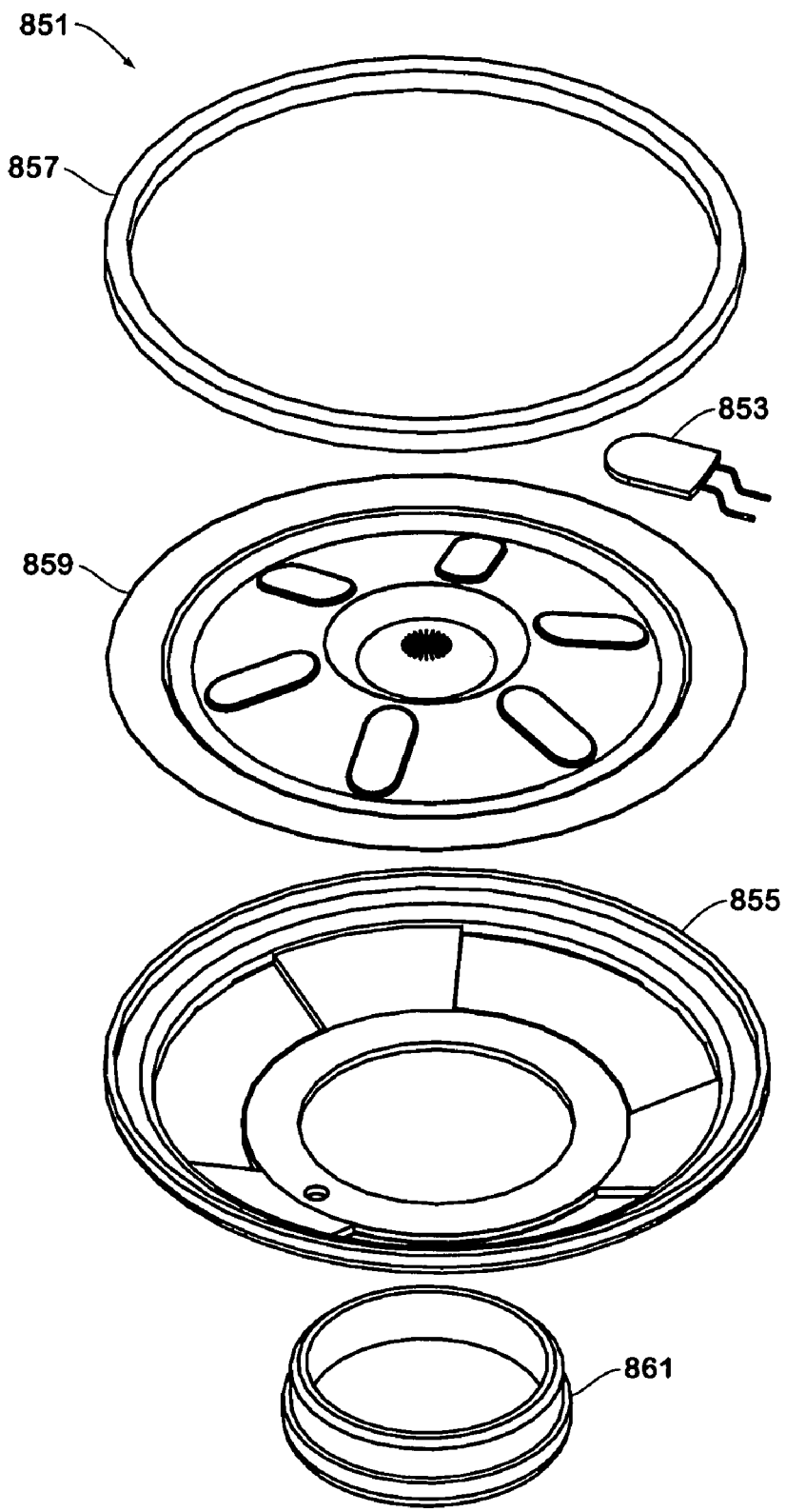
FIG. 22 is an exploded view of the coil sensor of FIG. 21.

In a further possible approach, one particular, non-limiting embodiment of which is depicted in FIGS. 21-22, the sensor 851 includes a piezoelectric crystal device 853 that is located on the edge of a speaker assembly that will typically include a basket 855, a suspension 857, a diaphragm 859 and a magnet 861. The piezoelectric crystal device 853 senses the motion of the diaphragm 859 with respect to the rim or edge of the basket 855, or any other fixed reference point. The piezoelectric crystal device 853 is typically attached so that one end of the device is in contact with the diaphragm 859 and the other end is fixed. The motion of the diaphragm 859 flexes the crystal in the piezoelectric crystal device 853 and produces a voltage which is related to the motion of the diaphragm 859. This time varying voltage is then utilized as the feedback signal.

In another possible approach, the sensor is a small resistor which is arranged in series with the drive coil. The current flowing through the drive coil produces a voltage across the resistor. This voltage is utilized as the feedback signal. The current flowing through the coil is a function of the circuit impedance. The impedance of the electromagnetic mechanical acoustic assembly is influenced by the permanent magnet, the DC resistance of the drive coil, and the motion of the drive coil, the latter of which is further influenced by the position of the drive coil in the gap, the stiffness and relative spring constant of the diaphragm and surround, and the airflow resistance and back pressure through the jet ports used in the thermal management (or controlled turbulent flow) application. Thus, the voltage across the resistor sensor is related to the time varying motion of the diaphragm and can be used as a feedback signal to control the motion. This feedback relationship is valid for short term corrections (for example, during each drive signal cycle) and long-term corrections (for example, the type of corrections that may be necessary to compensate for temperature, environmental, and material properties changes.

In a further possible approach, the sensor is a bridge circuit with the actuator coil disposed in one leg of the bridge. The bridge is driven from two opposite corners. A voltage difference is sensed between the other two opposite corners of the bridge. When the bridge circuit is initially balanced (that is, for example, when the impedances in each of the four legs of the bridge are equal), then, under small signal linear drive conditions, the sensed voltage is very close to zero. As the drive signal is increased and/or the impedance influencing conditions noted above become significant, the impedance of the coil leg of the bridge changes, and this causes the sensed voltage to change. Thus, this sensed voltage is related to the time varying motion of the diaphragm and can be used as a feedback signal to control the motion. This feedback relationship is valid for short term corrections (for example, during each drive signal cycle) and long-term corrections (for example, the type of corrections that may be necessary to compensate for temperature, environmental, and material properties changes.

Each of the sensors disclosed above may be used with signal conditioning options, such as analog and/or digital signal amplification and conditioning hardware and software. Some or all of that hardware or software may be part of the sensor disclosed.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A thermal management device, comprising:
   a synthetic jet ejector which operates at a variable operating characteristic selected from the group consisting of a frequency and an amplitude;
   a microphone which provides audio feedback to the thermal management device based on operation of said synthetic jet ejector, said audio feedback generated by the operation of said synthetic jet ejector;
   a controller adapted to modify the variable operating characteristic of the synthetic jet ejector based on receiving said audio feedback; and
   a programming bus, in communication with said controller, which provides programming instructions to said controller, wherein the programming instructions are modifiable to reduce said audio feedback generated by the operation of said synthetic jet ejector;
   wherein said programming bus is in communication with, and is programmable over, a communications network, and
   wherein said synthetic jet ejector dissipates heat from a heat source by directing a synthetic jet onto or across a surface of the heat source.

2. The thermal management device of claim 1, wherein the communications network is the Internet.

3. The thermal management device of claim 1, wherein said thermal management device is incorporated into a host system, and wherein said programming bus is programmable by the host system.

4. The thermal management device of claim 1, wherein said synthetic jet ejector is driven by a fixed voltage power source.

5. The thermal management device of claim 1, wherein said synthetic jet ejector is driven by a variable voltage power source.

6. The thermal management device of claim 5, wherein said controller is a microprocessor, and further comprising a voltage regulator which provides said microprocessor with a predefined voltage.

7. The thermal management device of claim 5, further comprising an H bridge integrated circuit electrically disposed between the variable voltage power source and the synthetic jet ejector.

8. The thermal management device of claim 7, wherein the H bridge has an input current and an output current, and further comprising a current sampling resistor which samples the input current.

9. The thermal management device of claim 1, wherein said thermal management device is equipped with a temperature input.

10. The thermal management device of claim 1, wherein said thermal management device is equipped with a tachometer output.

11. The thermal management device of claim 1, wherein said thermal management device is equipped with a pulse width modulation (PWM) input.

12. A thermal management system, comprising:
    a synthetic jet actuator;
    a microphone adapted to receive audio feedback from operation of said synthetic jet actuator; and
    a controller in communication with said synthetic jet actuator which receives programming instructions over a network, and which modifies the operation of said synthetic jet actuator in response to the programming instructions;
    wherein the programming instructions are modifiable based upon said audio feedback from the operation of said synthetic jet actuator to reduce said audio feedback from the operation of said synthetic jet actuator, and
    wherein said synthetic jet actuator dissipates heat from a heat source by directing a synthetic jet onto or across a surface of the heat source.

13. The thermal management system of claim 12, wherein the programming instructions modify a frequency at which the synthetic jet actuator operates.

14. A thermal management system embedded in a host system, the thermal management system comprising:
    a plurality of synthetic jet ejectors, wherein each member of said plurality of synthetic jet ejectors has an associated microphone; and
    a processor which controls operation of said plurality of synthetic jet ejectors over a network in accordance with programming instructions received from the host system;
    wherein said microphone is adapted to receive audio feedback from the operation of the associated member of said plurality of synthetic jet ejectors;
    wherein said programming instructions are modifiable to reduce said audio feedback from the operation of said plurality of synthetic jet ejectors; and
    wherein said each of said plurality of synthetic jet ejectors dissipates heat from a heat source by directing a synthetic jet onto or across a surface of the heat source.

15. The thermal management system of claim 14, wherein said processor is in communication with the host system.

16. The thermal management system of claim 14, wherein said programming instructions are received from said host system.

17. The thermal management system of claim 14, wherein said programming instructions are modifiable by said host system.

18. The thermal management system of claim 14, wherein said each of said plurality of synthetic jet ejectors has a dedicated H bridge integrated circuit associated with said each of said plurality of synthetic jet ejectors.

19. The thermal management system of claim 14, wherein said processor samples a current supplied to said each of said plurality of synthetic jet ejectors.

20. The thermal management system of claim 14, further comprising a programming bus, in communication with said processor, which provides said programming instructions to said processor.

21. The thermal management system of claim 20, wherein said programming bus is in communication with a communications network.

22. The thermal management system of claim 21, wherein said programming bus is programmable over the communications network.

23. The thermal management system of claim 22, wherein the communications network is the Internet.

24. The thermal management system of claim 20, wherein said programming bus is programmable by the host system.

25. The thermal management system of claim 14, wherein said thermal management system is equipped with a temperature input.

26. The thermal management system of claim 14, wherein said thermal management system is equipped with a tachometer output.

27. The thermal management system of claim 14, wherein said audio feedback received by said microphone relates to the operation of said each of said plurality of synthetic jet ejectors that said microphone is associated with.

28. The thermal management system of claim 27, wherein said microphone transmits data relating to said audio feedback to said processor.

29. The thermal management system of claim 14, wherein said thermal management system is equipped with a pulse width modulation (PWM) input.

* * * * *